United States Patent
Chen et al.

(10) Patent No.: US 11,283,104 B2
(45) Date of Patent: Mar. 22, 2022

(54) RECHARGEABLE DUAL ELECTROPLATING CELL

(75) Inventors: Guorong Chen, Fairborn, OH (US); Yanbo Wang, Fairborn, OH (US); Qing Fang, Fairborn, OH (US); Bor Z. Jang, Centerville, OH (US); Aruna Zhamu, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 1155 days.

(21) Appl. No.: 13/507,057

(22) Filed: Jun. 1, 2012

(65) Prior Publication Data
US 2013/0319870 A1  Dec. 5, 2013

(51) Int. Cl.
*H01M 10/054* (2010.01)
*H01M 4/66* (2006.01)
*H01M 4/137* (2010.01)
*H01M 4/134* (2010.01)
*H01M 4/587* (2010.01)
(Continued)

(52) U.S. Cl.
CPC ......... *H01M 10/054* (2013.01); *H01M 4/133* (2013.01); *H01M 4/134* (2013.01); *H01M 4/137* (2013.01); *H01M 4/587* (2013.01); *H01M 4/663* (2013.01); *H01M 10/0525* (2013.01);
(Continued)

(58) Field of Classification Search
CPC ........ H01M 4/663; H01M 4/96; H01M 4/583; H01M 4/587; H01M 4/80–808; H01M 4/602–608; H01M 4/661–662; H01M 4/30–685
See application file for complete search history.

(56) References Cited

U.S. PATENT DOCUMENTS

| 5,766,799 A * | 6/1998 | Hong ............... H01M 4/242 29/623.5 |
| 2004/0012913 A1* | 1/2004 | Andelman ......... C02F 1/4691 361/503 |

(Continued)

FOREIGN PATENT DOCUMENTS

| JP | 02220373 A * | 9/1990 | ......... H01M 4/60 |
| WO | WO-2010059729 A1 * | 5/2010 | ......... H01M 4/663 |
| WO | WO-2012098345 A2 * | 7/2012 | ......... B01J 13/0091 |

OTHER PUBLICATIONS

Merriam Webster, Mat (2010).*
(Continued)

*Primary Examiner* — Ho-Sung Chung

(57) ABSTRACT

A dual electroplating cell comprising: (a) an electrolyte component containing therein ions of a first metal; (b) a porous cathode current collector having surface areas to capture and store metal ions directly thereon, wherein the cathode current collector has a specific surface area greater than 100 m$^2$/g that is in direct contact with said electrolyte; (c) a porous anode current collector having surface areas to capture and store metal ions thereon, wherein the anode current collector has a specific surface area greater than 100 m$^2$/g that is in direct contact with the electrolyte; (d) a porous separator disposed between the anode and the cathode; and (e) an ion source of the first metal disposed in the anode current collector or the cathode current collector and in electronic contact therewith to obtain an open circuit voltage (OCV) from 0.3 volts to 3.5 volts when the cell is made.

18 Claims, 14 Drawing Sheets

(51) Int. Cl.
*H01M 10/0525* (2010.01)
*H01M 4/133* (2010.01)
*B82Y 40/00* (2011.01)
*B82Y 30/00* (2011.01)
*H01M 4/02* (2006.01)

(52) U.S. Cl.
CPC .............. *B82Y 30/00* (2013.01); *B82Y 40/00* (2013.01); *H01M 2004/021* (2013.01); *Y02T 10/70* (2013.01)

(56) References Cited

U.S. PATENT DOCUMENTS

| | | | | |
|---|---|---|---|---|
| 2006/0029857 A1* | 2/2006 | Cherepy | ................ | H01M 4/02 429/128 |
| 2006/0093885 A1* | 5/2006 | Krusic | ................ | C08J 5/2218 429/483 |
| 2008/0050653 A1* | 2/2008 | Berkowitz | .......... | H01M 4/0404 429/221 |
| 2008/0089013 A1* | 4/2008 | Zhong | ................ | C04B 35/532 361/502 |
| 2008/0279756 A1 | 11/2008 | Zhamu et al. | | |
| 2009/0029196 A1* | 1/2009 | Finkelshtain | ......... | H01M 4/661 429/454 |
| 2009/0090640 A1* | 4/2009 | Jang | ................ | B82Y 30/00 205/555 |
| 2009/0107842 A1* | 4/2009 | Park | ................ | B82Y 30/00 204/554 |
| 2009/0117466 A1* | 5/2009 | Zhamu | ................ | H01M 4/02 429/231.8 |
| 2009/0186276 A1* | 7/2009 | Zhamu | ................ | H01M 4/045 429/221 |
| 2010/0021819 A1* | 1/2010 | Zhamu | ................ | H01G 9/058 429/231.8 |
| 2010/0092809 A1* | 4/2010 | Drzal | ................ | H01M 4/0416 429/413 |
| 2010/0173198 A1* | 7/2010 | Zhamu | ................ | H01M 4/134 429/222 |
| 2010/0178543 A1* | 7/2010 | Gruner | ................ | B82Y 30/00 429/121 |
| 2010/0248040 A1* | 9/2010 | Saito | ................ | C01G 45/1228 429/341 |
| 2010/0291444 A1* | 11/2010 | Farmer | ............... | H01M 4/0404 429/322 |
| 2011/0070487 A1* | 3/2011 | Padhi | ................ | C01G 45/02 429/206 |
| 2011/0104571 A1* | 5/2011 | Zhamu | ................ | H01B 1/122 429/231.95 |
| 2011/0143202 A1* | 6/2011 | Farmer | ............... | H01M 4/0416 429/218.1 |
| 2012/0045688 A1 | 2/2012 | Liu et al. | | |
| 2012/0077080 A1 | 3/2012 | Liu et al. | | |
| 2012/0164539 A1 | 6/2012 | Zhamu et al. | | |
| 2012/0171574 A1 | 7/2012 | Zhamu et al. | | |
| 2013/0004798 A1* | 1/2013 | Huang | ................ | H01M 8/16 429/2 |
| 2013/0059174 A1 | 3/2013 | Zhamu et al. | | |
| 2013/0162216 A1* | 6/2013 | Zhamu | ................ | H01G 11/06 320/130 |
| 2013/0171502 A1* | 7/2013 | Chen | ................ | H01G 11/06 429/149 |
| 2013/0190956 A1 | 7/2013 | Zhamu et al. | | |
| 2013/0202945 A1* | 8/2013 | Zhamu | ................ | B82Y 30/00 429/156 |
| 2013/0213677 A1* | 8/2013 | Zhamu | ................ | B25F 5/00 173/1 |
| 2013/0216894 A1* | 8/2013 | Wang | ................ | H01M 4/13 429/158 |
| 2013/0224603 A1* | 8/2013 | Chen | ................ | B82Y 30/00 429/322 |
| 2013/0260246 A1* | 10/2013 | Chen | ................ | H01M 4/133 429/221 |
| 2013/0271085 A1* | 10/2013 | Chen | ................ | H01M 4/0445 320/132 |
| 2013/0302697 A1* | 11/2013 | Wang | ................ | B82Y 30/00 429/300 |

OTHER PUBLICATIONS

Higuchi et al., Machine Translation Jp H02-220373 A. (Year: 1990).*
U.S. Appl. No. 12/930,294, filed 01-93-2011, A. Zhamu, et al.
U.S. Appl. No. 12/928,927, filed Dec. 23, 2010, A. Zhamu, et al.
U.S. Appl. No. 12/806,679, filed Aug. 9, 2010, C. G. Liu, et al.
U.S. Appl. No. 12/924,211, filed Sep. 23, 2010, C. G. Liu, et al.
U.S. Appl. No. 13/199,713, filed Sep. 7, 2011, A. Zhamu, et al.
U.S. Appl. No. 11/800,728, filed May 8, 2007, A. Zhamu, et al.
U.S. Appl. No. 13/374,321, filed Dec. 21, 2011, A. Zhamu, et al.
U.S. Appl. No. 13/374,894, filed Jan. 23, 2012, A. Zhamu, et al.
U.S. Appl. No. 13/385,561, filed Feb. 27, 2012, G. R. Chen, et al.
U.S. Appl. No. 13/385,105, filed Feb. 3, 2012, A, Zhamu, et al.
U.S. Appl. No. 13/506,736, filed May 14, 2012, Y. Wang, et al.

* cited by examiner

RECHARGEABLE DUAL ELECTROPLATING CELL

FIELD OF THE INVENTION

This invention relates generally to the field of rechargeable batteries and, more particularly, to a new Dual Electroplating Cell (DEC) having a high energy density and high power density.

BACKGROUND OF THE INVENTION

For over three decades, battery scientists have been frustrated with the low energy density and low power density of lithium-ion cells and other rechargeable batteries. The low energy density, typical specific energy of 120-180 Wh/kg, is due to two main reasons:

(1) The basic configuration of the most commonly used modern rechargeable batteries (e.g., lithium metal secondary cell and lithium-ion secondary cell) and emerging rechargeable batteries (e.g. magnesium secondary cell and surface-mediated cell) is a five-layer structure: an anode current collector, an anode (negative electrode=anode active material+conductive additive+resin binder), a separator, a cathode (positive electrode=cathode active material+conductive additive+resin binder), and a cathode current collector.
  a. For instance, a typical lithium-ion secondary cell has a copper foil-based anode current collector, a graphite anode (graphite particles+SBR rubber binder+acetylene black), a porous polyolefin separator, a lithium transition metal oxide cathode ($LiCoO_4$ particles+PVDF binder+conductive additive), and an aluminum foil-based cathode current collector.
  b. In a lithium metal secondary cell, a lithium metal foil is used in lieu of the graphite anode, and a $MoS_2$ cathode is used in lieu of the lithium transition metal oxide cathode. In each case, the basic configuration contains five layers. Such a configuration is heavy in mass and bulky in volume. Additionally, Cu foil has a relatively high physical density (8.9 $g/cm^3$).

(2) Furthermore, the most commonly used anode active material (graphite) in a lithium-ion cell has a limited lithium storage capacity (theoretical specific capacity of 372 mAh/g) and all of the current cathode active materials have a practical specific capacity lower than 250 mAh/g, mostly lower than 200 mAh/g.

The low power density (typically <1 kW/kg and more typically <500 W/kg) of all the rechargeable batteries, other than the surface-mediated cells and a new type of Mg-ion cell most recently invented by our research group, is primarily due to the following reasons:

(1) For a lithium-ion cell, the discharge process involves the de-intercalation (extraction) of lithium from the bulk of a graphite particle (typically >>10 μm in size), requiring a long diffusion path with a low solid-state diffusion coefficient of Li ions in graphite (typically $D<10^{-7}$ $cm^2/s$). These extracted Li ions have to travel through electrolyte (relatively slow if solid electrolyte, not liquid, is used) and intercalate into the interior of a cathode active material. The intercalation process is even slower in the cathode since the solid state diffusion coefficient is very low (typically $D<10^{-8}$ $cm^2/s$ and mostly $D<10^{-12}$ $cm^2/s$).

(2) For the lithium metal cell and magnesium metal cell, slow solid-state diffusion at the cathode is required.

(3) In some rechargeable cells, slow chemical reactions have to occur at the cathode. For instance, several intermediate reactions occur at the cathode of a lithium-sulfur cell, which have relatively poor kinetics.

Hence, there has been strong and continued demand for rechargeable batteries capable of storing more energy (Wh/l or Wh/kg) and delivering more power (W/kg or W/l) than current rechargeable Li-ion, Li-metal, and Mg batteries.

There are other additional shortcomings associated with current rechargeable batteries:

(1) The production of cathode active materials in both the Li-ion and Mg batteries normally has to go through a high-temperature sintering procedure for a long period of time, a tedious, energy-intensive, and difficult-to-control process.

(2) The current cathode materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low specific capacity. The low thermal conductivity also implies a higher tendency to undergo thermal runaway, a major safety issue in lithium or magnesium battery industry.

(3) Most of these cathodes contain a high oxygen content that could assist in accelerating the thermal runaway and provide oxygen for electrolyte oxidation, increasing the danger of explosion or fire hazard. This is a serious problem that has hampered the widespread implementation of lithium-ion batteries in electric vehicles (EVs). If not properly addressed, this problem will also impede the use of future Mg-ion batteries in EVs.

Hence, it is an object of the present invention to provide a rechargeable battery that has the following highly desirable features. These features or advantages, alone or in combination, are not found in any prior art rechargeable battery:

(a) Having a high-capacity cathode current collector having massive surface areas that are capable of storing various metal ions thereon up to a specific capacity greater than 250 mAh/g, more preferably greater than 500 mAh/g, further preferably greater than 800 mAh/g;

(b) Exhibiting a cell-level specific energy greater than 250 $Wh/kg_{cell}$, preferably greater than 300 $Wh/kg_{cell}$, further preferably greater than 400 $Wh/kg_{cell}$, or even greater than 500 $Wh/kg_{cell}$.

(c) Having a high-capacity cathode current collector (with a specific capacity significantly greater than 250 mAh/g) that can be readily prepared without going through an energy-intensive sintering process.

(d) Having an integrated cathode electrode/current collector, with a weight and volume lower than the combined weight and volume of separate and discrete cathode electrode and cathode current collector.

(e) Having an integrated anode electrode/current collector, with a weight and volume lower than the combined weight and volume of separate and discrete anode electrode and anode current collector.

(f) Having a three-layer configuration, as opposed to the usual five-layer configuration of an electrochemical cell.

(g) Having a high-capacity cathode current collector (with a specific capacity greater than 250 mAh/g) that is capable of storing magnesium or lithium atoms (or other metal atoms or ions, such as K, Na, and Zn) without the need to undergo intercalation or solid-state diffusion, thereby leading to a significantly improved power density and reduced recharge time.

(h) Having a high-capacity cathode current collector that is electrically and thermally conductive, enabling high-rate capability and effective heat dissipation in a rechargeable cell.

(i) Having a high-capacity cathode current collector that contains little or no oxygen, reducing or eliminating the potential fire hazard or explosion.

It may be noted that the high-power surface-mediated cell (SMC) and the new type of high-energy Mg-ion cell recently invented by our research group are all based on the five-layer configurations. The meso-porous graphitic and carbon materials used in these SMC and new Mg-ion cells were implemented as a cathode active material (not cathode current collector) or as an anode active material (not anode current collector). Examples of these recent inventions are given below:

Aruna Zhamu, Guorong Chen, Qing Fang, Xiqing Wang, Yanbo Wang, and Bor Z. Jang, "Surface-Mediated Cells with High Power Density and High energy Density," U.S. patent application Ser. No. 13/385,105 (Feb. 3, 2012).

Yanbo Wang, Aruna Zhamu, and Bor Z. Jang, "Rechargeable Magnesium-Ion Cell Having a High-Capacity Cathode," U.S. patent application Ser. No. 13/506,736 (May 14, 2012).

SUMMARY OF THE INVENTION

The present invention provides a dual electroplating cell (DEC) comprising: (a) an electrolyte containing therein ions of a first metal; (b) a porous cathode current collector having massive surface areas to capture and store metal ions directly thereon without using a cathode active material, wherein the cathode current collector has a specific surface area greater than 100 $m^2/g$ that is in direct contact with the electrolyte (these surface areas being capable of capturing and storing metal ions); (c) a porous anode current collector having massive surface areas to capture and store metal ions directly thereon without using an anode active material, wherein the anode current collector has a specific surface area greater than 100 $m^2/g$ that is in direct contact with the electrolyte (these surface areas being capable of capturing and storing metal ions); (d) a porous separator disposed between the anode current collector and the cathode current collector; and (e) an ion source of the first metal disposed in the anode current collector or the cathode current collector and in electronic contact therewith to obtain an open circuit voltage (OCV) from 0.1 volts to 4.5 volts when the cell is made. In most cases, the OCV is from 0.5 volts to 3.8 volts.

As a special feature, the anode current collector itself, in addition to transporting electrons into the anode side, also acts to capture and store the first metal ions (Li, Mg, K, Na, Zn, etc) on its massive surfaces when the cell is recharged. When the cell is discharged, the anode current collector releases the metal ions (into the electrolyte phase) and concurrently transporting the electrons out of the anode side (into the external load). There is no additional or separate layer of an anode active material used at the anode. Alternatively or additionally, the cathode current collector itself also acts to capture and store the first metal ions on its massive surfaces when the cell is discharged. There is no additional or separate cathode active material used in the cathode. Essentially, the current collector is an integrated structure with the current collecting and the metal-storing functions being merged into one layer, instead of two separate layers.

The massive surfaces of the current collector layer of a DEC are capable of storing an exceptionally high amount of the first metal, resulting in a cell of exceptionally high energy density. Further, the first metal is generally stored on the surfaces of the material(s) that constitute the integrated current collector/electrode. There can be more than one type of metal in the cell wherein ions of a first metal and ions of a second metal (or more than 2 types of metal) are shuttled between the anode and the cathode current collectors during the charge and discharge operations of the cell.

It may be noted that there might have been some porous current collector used in a prior art lithium-ion battery, such as a Ni foam, Cu foam, Al foam, graphite foam, or carbon foam. However, these foam materials are used as a current collector (or a conducting substrate) for an anode active material (e.g. graphite particles or Si particles) at the anode, or as a current collector (or conducting substrate) for a cathode active material (e.g. lithium iron phosphate or lithium transition metal oxide) at the cathode. The prior art lithium-ion battery still needs a separate anode active material and a separate cathode active material. These current collectors in these prior art cells were not used, or suggested for use, as an electrode active material or as a combined active material and current collector.

The metal ion source preferably comprises a chip, foil, powder, particle, fiber, rod, wire, film, coating, or a combination thereof of the first metal, alloy of the first metal, or compound of the first metal in contact with the anode current collector or cathode current collector. The first metal is selected from: (A) alkali metal selected from lithium (Li), sodium (Na), potassium (K), rubidium (Rb), caesium (Cs), francium (Fr), or a combination thereof; (B) alkaline-earth metal selected from beryllium (Be), magnesium (Mg), calcium (Ca), strontium (Sr), barium (Ba), radium (Ra), or a combination thereof; (C) a transition metal; (D) aluminum (Al), gallium (Ga), indium (In), tin (Sn), lead (Pb), or bismuth (Bi); or a combination thereof. Of particular interest are Li, Na, K, Mg, Ca, and Zn due to their high negative potential or abundance as an element. The element gallium (Ga), indium (In), tin (Sn), lead (Pb), or bismuth (Bi) is usually not used alone as the first metal, but is added to modify other metallic elements, such as Al or a transition metal.

In one preferred embodiment, the cathode current collector or anode current collector is selected from a highly porous sheet, paper, web, film, fabric, non-woven, mat, aggregate, or foam of a carbon or graphite material that has been expanded, activated, chemically treated, exfoliated, and/or isolated (isolation means the graphene planes that constitute a carbon crystal have been separated and isolated from one another to form graphene sheets). Being highly porous implies that the current collector must have a specific surface area greater than 100 $m^2/g$. This carbon or graphitic material may be selected from graphene, graphene oxide, reduced graphene oxide, graphene fluoride, doped graphene, functionalized graphene, expanded graphite (with an inter-graphene spacing >0.4 nm), exfoliated graphite or graphite worms, chemically etched or expanded soft carbon, chemically etched or expanded hard carbon, exfoliated activated carbon, chemically etched or expanded carbon black, chemically etched multi-walled carbon nanotube, nitrogen-doped carbon nanotube with an enhanced metal ion capturing ability, boron-doped carbon nanotube with an enhanced metal ion capturing ability, chemically doped carbon nanotube with an enhanced metal ion capturing ability, ion-implanted carbon nanotube, chemically treated multi-walled carbon nanotube with an inter-graphene planar separation no less than 0.4 nm, chemically expanded carbon nano-fiber, chemically activated or expanded carbon nano-tube with an enhanced metal ion capturing ability, chemically activated carbon fiber or graphite fiber, chemically activated carbonized polymer fiber, coke, meso-phase carbon, or a combination thereof. The expanded spacing is preferably greater than 0.5 nm. The main purpose of chemical activation, expansion, doping, ion-implantation, etc. is to improve the ability of current collector material surfaces to capture and store metal ions that are shuttled between the anode and the cathode sides. The phrase "with an enhanced metal ion capturing ability" is relative to the graphite or carbon material without the corresponding chemical activation, expansion, doping, or ion-implantation treatment.

After extensive and in-depth studies, we have observed that the constituent hexagonal carbon planes or aromatic ring structures in the aforementioned porous carbon or graphite materials appear to be capable of capturing and storing metal ions (Li, Mg, etc) through chemical/physical sorption and/or electroplating mechanisms.

In another preferred embodiment, the cathode current collector or anode current collector in this dual electroplating cell is a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nano-wire mat, surface-passivated porous metal, porous conductive polymer film, conductive polymer nano-fiber mat or paper, conductive polymer foam, carbon foam, carbon aerogel, carbon xerogel, graphene foam, graphene oxide foam, reduced graphene oxide foam, or a combination thereof.

The metal fiber mat, carbon-coated metal-fiber mat, graphene-coated metal-fiber mat, metal nanowire mat, carbon-coated metal nanowire mat, graphene-coated metal nano-wire mat, conductive polymer nano-fiber mat or paper, conductive polymer foam, carbon foam, carbon aerogel, carbon xerogel, graphene foam, graphene oxide foam, or reduced graphene oxide foam contains a binder and/or reinforcement filler selected from a resin binder, a conductive polymer binder, a carbonized resin binder, carbon nano-tube, carbon nano-fiber, or a combination thereof.

After extensive and in-depth studies, we have observed that the aforementioned porous and electrically conductive materials appear to be capable of capturing and storing metal ions (Li, Mg, etc) through chemical/physical sorption or electroplating mechanisms. The electroplating mechanism appears to dominate if only the conductive material is present in the current collector (without a carbon or graphene coating). The carbon or graphene coating tends to have combined mechanisms of chemical sorption and electroplating.

Since both the anode and the cathode current collector are capable of storing metal ions on surfaces through the electroplating mechanism, the presently invented rechargeable cell is referred to as a dual electroplating cell (DEC).

It is advantageous to design a dual electroplating cell featuring a cathode or anode current collector that has a specific surface area greater than 500 $m^2/g$, preferably greater than 1,000 $m^2/g$, and most preferably greater than 1,500 $m^2/g$. We have found that the specific capacity of an electrode of the present invention is generally proportional to the specific surface area of a current collector. The cathode or anode current collector preferably contains meso-scale pores having a pore size from 2 nm to 50 nm. The anode current collector may contain particles preloaded with the first metal, and these preloaded particles are disposed in pores of the current collector. More preferably, the anode current collector is pre-impregnated with the first metal, e.g. through electrochemical deposition before the cell is made.

The dual electroplating cell may contain organic liquid electrolyte, ionic liquid electrolyte, gel electrolyte, polymer electrolyte, solid electrolyte, or a combination thereof.

A preferred embodiment of the present invention is a dual electroplating cell comprising: (a) an anode; (b) a cathode; (c) an electrolyte containing therein ions of at least a first metal; (d) a porous separator disposed between the anode and the cathode; and (e) an ion source of at least the first metal (possibly including a second metal, third metal, etc.) disposed in the anode or the cathode and in electronic contact therewith; wherein the cathode is made of an integrated cathode current collector that is porous, having surface areas to capture and store metal ions directly thereon without using a separate cathode active material and having a specific surface area greater than 100 $m^2/g$ that is in direct contact with the electrolyte and/or wherein the anode is made of an integrated anode current collector that is porous, having surface areas to capture and store metal ions directly thereon without using a separate anode current collector and having a specific surface area greater than 100 $m^2/g$ that is in direct contact with the electrolyte.

The present invention also provides a method of operating a dual electroplating cell. The method comprises discharging the cell to a first lower voltage limit (LVL) lower an open circuit voltage (OCV) that is measured when the cell is made, and then charging the cell to a first upper voltage limit (UVL). The cell may then be subsequently discharged and discharged between a second LVL (that can be different from or the same as the first LVL) and a second UVL (that can be different from or the same as the first UVL).

DESCRIPTION OF THE PREFERRED EMBODIMENTS

The present invention provides a dual electroplating cell (DEC) comprising: (a) an electrolyte containing therein ions of a first metal; (b) a porous cathode current collector having surface areas to capture and store metal ions thereon, wherein the cathode current collector has a specific surface area greater than 100 $m^2/g$ that is in direct contact with said electrolyte (no separate or additional cathode active material being used); (c) a porous anode current collector having surface areas to capture and store metal ions thereon, wherein the anode current collector has a specific surface area greater than 100 $m^2/g$ that is in direct contact with the electrolyte (no separate or additional anode active material being used); (d) a porous separator disposed between the anode and the cathode current collectors; and (e) an ion source of the first metal disposed in the anode current collector or the cathode current collector and in electronic contact therewith to obtain an open circuit voltage (OCV) from 0.1 volts to 4.5 volts (mostly 0.3-3.8 volts) when the cell is made. These specific surface areas that are directly exposed to metal ion-carrying electrolyte stand ready to capture metal ions from the electrolyte and store the metal ions on surfaces. Since the specific capacity of these metal ion-storing surfaces is found by us to be proportional to the specific surface area, the specific surface area is preferably greater than 500 $m^2/g$, more preferably greater than 1,000 $m^2/g$, and most preferably greater than 1,500 $m^2/g$.

It may be noted that these high surface areas are in direct contact with the electrolyte that carries metal ions therein. These metal ions (e.g., $Li^+$ and $Mg^{2+}$) can be readily captured by the active surfaces of the porous graphitic/carbon material, conductive polymer fibers, metal nano wires, etc. of a current collector without having to undergo slow solid-state diffusion. In other words, the metal ions can readily approach active material surfaces without intercalation (in contrast to the conventional Li-ion cells and Mg cells that require $Li^+$ or $Mg^{2+}$ ions to diffuse into the interior of a conventional intercalation compound, such as $LiMnO_4$ and Chevrel phase for the Li-ion cell and the Mg cell, respectively, as a cathode active material. This intercalation-free strategy enables a high specific power (W/kg), which can be several orders of magnitude higher than those of current Mg-ion and Li-ion cells.

Figure 1:
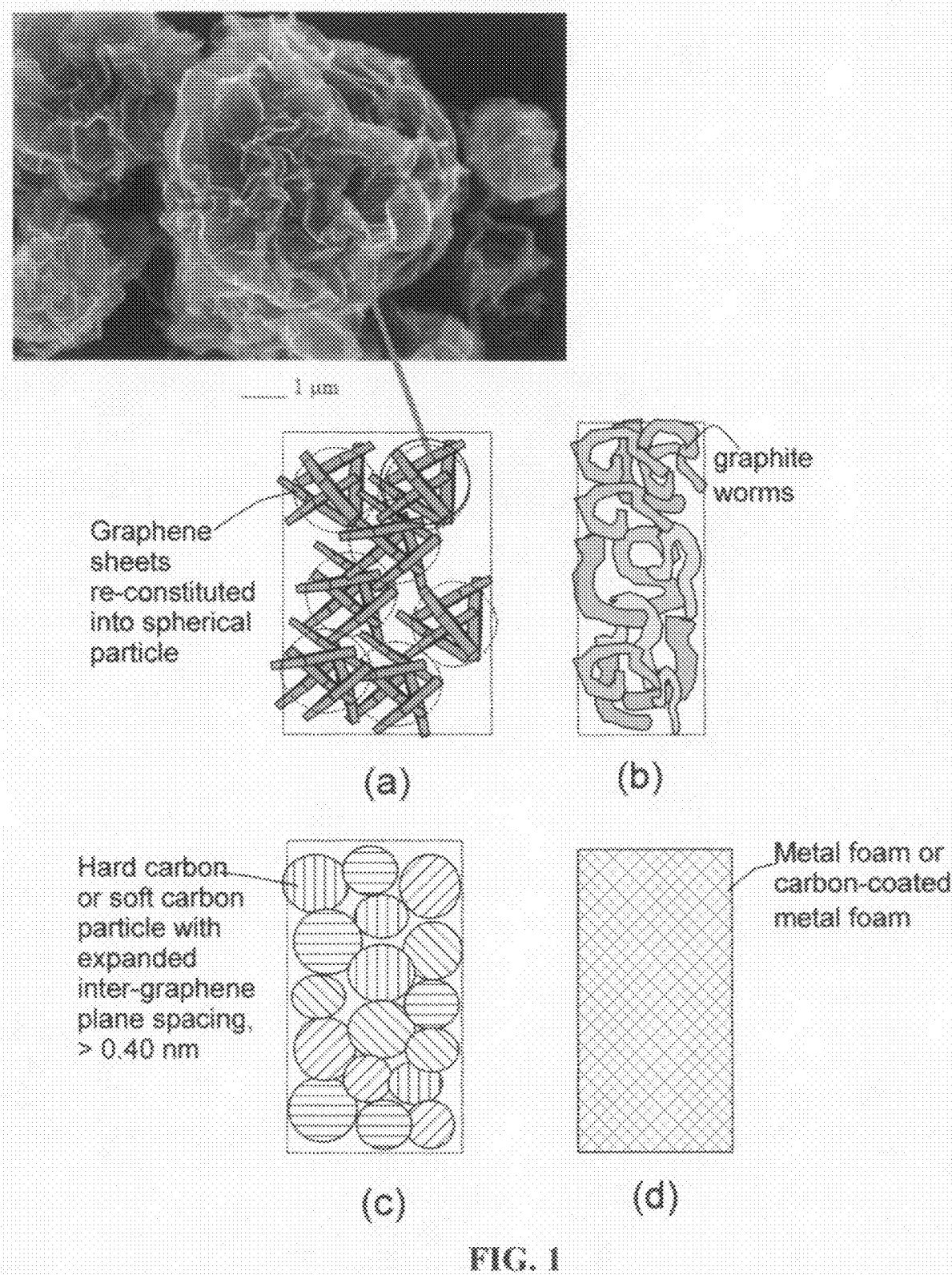
FIG. 1 Four examples of porous current collectors that can be used in a dual electroplating cell (DEC): (A) Graphene sheets reconstituted into porous spherical particles that form an integral meso-porous structure for current collecting and metal ion adsorption/plating; (B) Graphite worms bonded to form a porous structure having massive surfaces to capture metal ions thereon; (C) An integral, porous structure composed of chemically treated soft carbon or hard carbon particles with expanded inter-graphene spacing (>0.4 nm, preferably >0.6 nm, and most preferably >0.8 nm); and (D) A metal foam, carbon foam, or graphite foam having great amount of meso-pores and exhibiting a high specific surface area (preferably >>100 $m^2/g$).
Figure 4A:
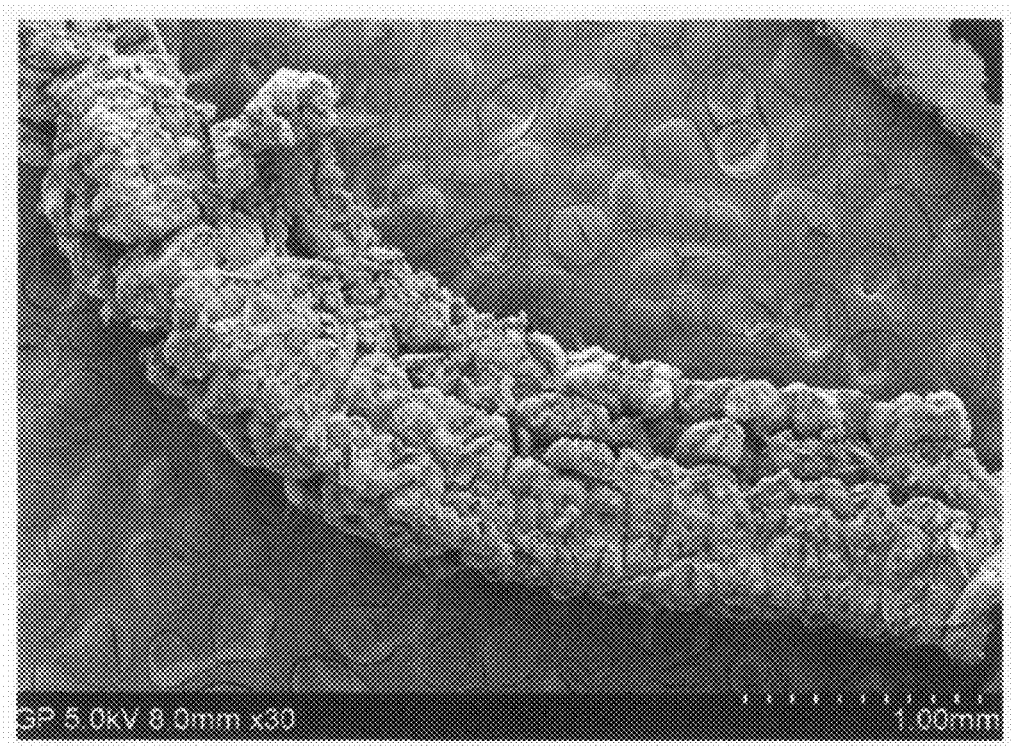
FIG. 4 SEM images of (A) a graphite worm; (B) another graphite worm taken at a higher magnification; (C) a meso-porous graphitic structure prepared by exfoliating a soft carbon; (D) a meso-porous graphitic structure prepared by chemically etching or expanding a hard carbon material; (E) an expanded MCMB; (F) expanded carbon fibers; and (G) a meso-porous structure made of graphene sheets re-constituted into an approximately spherical shape.
Figure 4B:
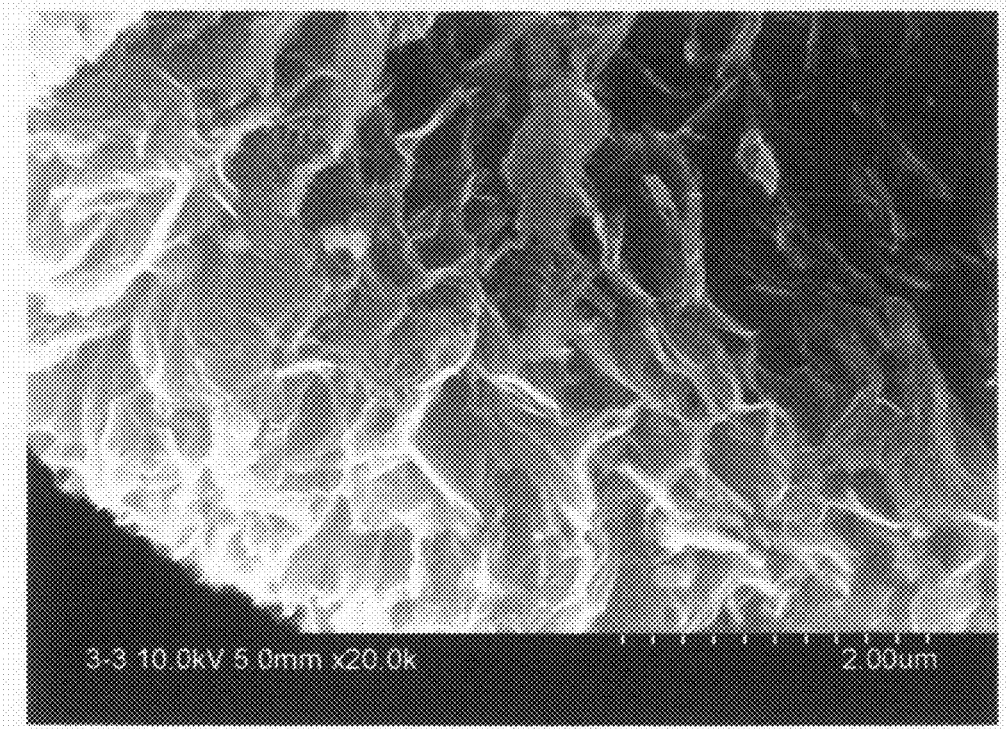

Schematically shown in FIG. 1(A)-(D) are four examples of porous current collectors that can be used in a DEC. FIG. 4(A) shows an example wherein multiple graphene sheets are reconstituted into porous spherical particles that are bonded to form an integral meso-porous structure to perform current collecting and metal ion adsorption/plating functions. FIG. 1(B) shows a second example of a porous current collector wherein a plurality of graphite worms are bonded to form a porous structure having massive surfaces to capture metal ions thereon. FIG. 1(C) shows an integral, porous structure composed of chemically treated soft carbon or hard carbon particles with expanded inter-graphene spacing (>0.4 nm, preferably >0.6 nm, and most preferably >0.8 nm). FIG. 1(D) shows a metal foam, carbon foam, or graphite foam having a great amount of meso-pores and exhibiting a high specific surface area (preferably >>100 $m^2/g$).

Figure 2:
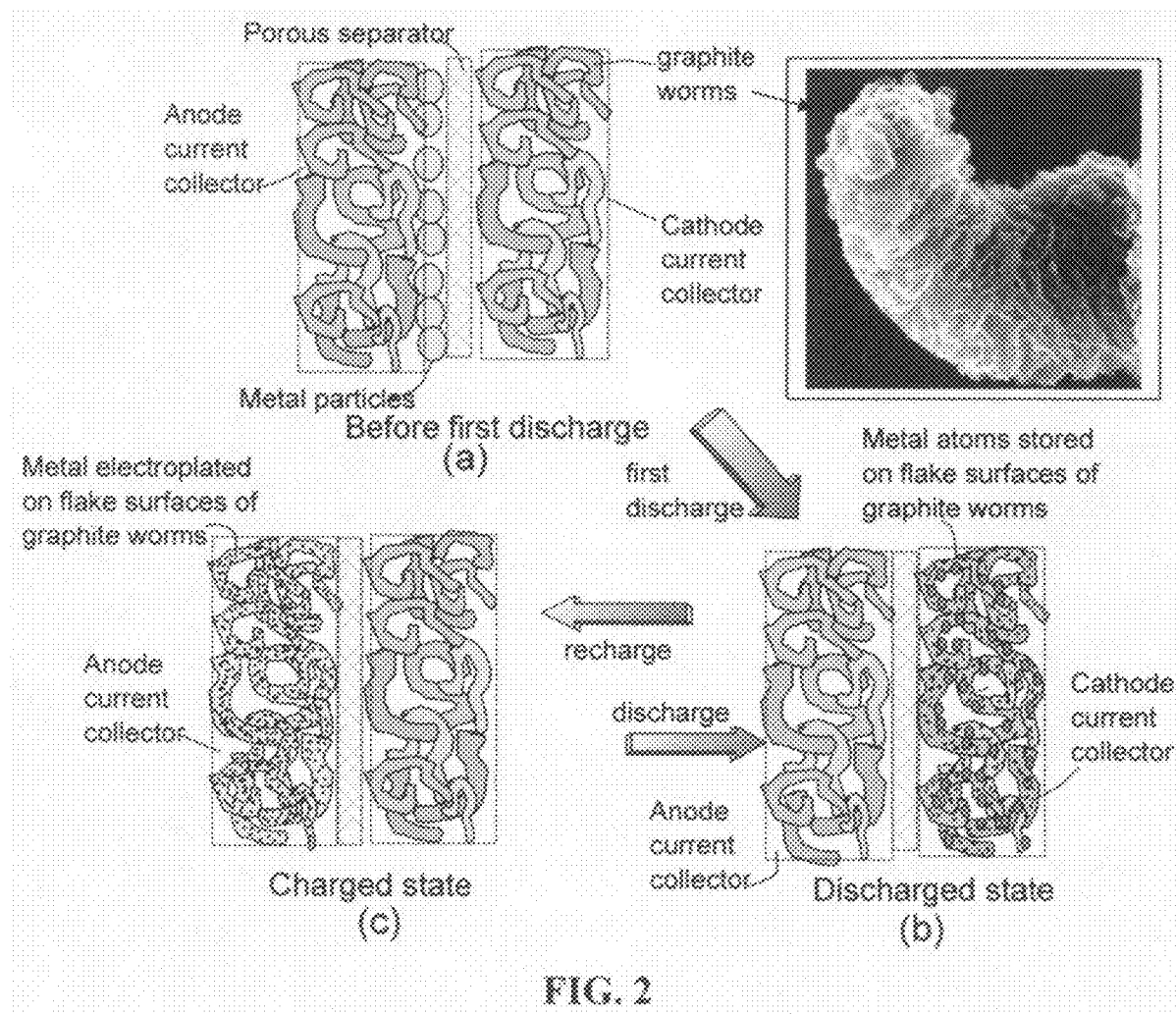
FIG. 2 (A) A DEC containing a porous graphite worm-based anode current collector and a similar cathode current collector according to another embodiment of the instant invention. This is a schematic showing a possible structure of this new type of cell when it is made (prior to the first discharge operation); (B) The structure of this cell after its first discharge operation (metal is ionized to form metal ions diffusing through liquid electrolyte to reach the graphite flake surfaces of the cathode current collector and get chemically adsorbed thereon or electrochemically plated thereon); (C) The structure of this cell after being re-charged (metal ions are released from the cathode current collector surfaces, diffusing through liquid electrolyte to reach the anode current collector surfaces and get electrochemically plated thereon).

FIG. 2(A) presents an example of the new DEC cell according to one preferred embodiment of the invention. The cell contains a porous graphitic structure (e.g. graphite worms bonded together) as a cathode current collector, a similar structure as an anode current collector, and a sheet of Li foil (as an ion source of the first metal) in electronic contact with the anode current collector. This is a schematic showing a possible structure of this new type of rechargeable cell when it is made (prior to the first discharge cycle). Due to the presence of this Li foil, which has a highly negative electrochemical potential with respect to the standard hydrogen electrode, there is a large potential difference between the anode and the cathode. This large potential difference is the primary driving force for Li to get dissolved to emit Li ions which are driven to move to the cathode, which is electrochemically more positive.

FIG. 2(B) illustrates the structure of this cell after its first discharge operation during which the first metal (e.g. Li foil) is ionized or dissolved, emitting massive metal ions into liquid electrolyte. These metal ions diffuse to reach the meso-porous graphitic structure at the cathode and get captured by the graphite flake surfaces of this cathode current collector. The mechanism of capturing can be through chemical adsorption (shown here), electro-plating, and/or other means (e.g. trapping in surface defects).

FIG. 2(C) illustrates the structure of this DEC device after being re-charged. Metal ions are released from the cathode current collector surfaces, diffusing through liquid electrolyte to reach the anode side and get electrochemically plated onto surfaces of graphite flakes of graphite worms that constitute the anode current collector. The electro-plated metal re-establishes an electrochemical potential differential between the anode and the cathode and the cell is ready for the next discharge cycle.

The ion source of the first metal in a DEC preferably comprises a chip, foil, powder, particle, fiber, rod, wire, film, coating, or a combination thereof of the first metal, alloy of the first metal, or compound of the first metal in contact with the anode current collector or cathode current collector. The first metal may be selected from: (A) an alkali metal selected from lithium (Li), sodium (Na), potassium (K), rubidium (Rb), caesium (Cs), francium (Fr), or a combination thereof; (B) an alkaline-earth metal selected from beryllium (Be), magnesium (Mg), calcium (Ca), strontium (Sr), barium (Ba), radium (Ra), or a combination thereof; (C) a transition metal; (D) aluminum (Al), gallium (Ga), indium (In), tin (Sn), lead (Pb), or bismuth (Bi); or a combination thereof. Of particular interest are Li, Na, K, Mg, Ca, Al, Ti, and Zn due to their highly negative electrochemical potential and/or their abundance as an element.

It may be noted that the anode current collector and the cathode current collector in a DEC do not have to be identical or similar in terms of the structure or material used. However, it is preferable and advantageous if they meet the following technical requirements:
(a) The current collectors must be chemically compatible or stable with respect to the electrolyte used, not to irreversibly react with the electrolyte and not to catalyze the decomposition of electrolyte. In this respect, carbon-based materials are particularly preferred.
(b) Each current collector forms a porous structure having a high specific surface area directly accessible to the electrolyte. The surfaces must be capable of accepting and capturing metal ions from the electrolyte through chemical/physical adsorption and/or electrochemical plating of metal ions on these surfaces.
(c) Preferably, the anode current collector is more electrochemically negative than the cathode current collector; but, the materials themselves that constitute the current collector should not become dissolved or ionized during the charge/discharge cycles.
(d) The current collector should not be inclined to form an irreversible compound with the first metal (or the second metal, if present).

The following types of porous structures are found to be particularly suitable for use as a cathode current collector or anode current collector: a porous sheet, paper, web, film, fabric, non-woven, mat, aggregate, or foam of a carbon or graphite material that has been expanded, activated, chemically treated, exfoliated, and/or isolated (isolation means the graphene planes that constitute a carbon crystal have been separated and isolated from one another to form graphene sheets). This porous structure contains graphene, graphene oxide, reduced graphene oxide, graphene fluoride, doped graphene, functionalized graphene, expanded graphite with an inter-graphene spacing greater than 0.4 nm, exfoliated graphite, chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-graphene planar separation no less than 0.4 nm, chemically expanded carbon nano-fiber, chemically activated or expanded carbon nano-tube, carbon fiber, graphite fiber, carbonized polymer fiber, coke, meso-phase carbon, or a combination thereof. The expanded spacing is preferably >0.5 nm, more preferably >0.6 nm, and most preferably >0.8 nm.

The constituent hexagonal carbon planes or aromatic ring structures in the aforementioned porous carbon or graphite materials appear to be capable of capturing and storing metal ions (Li, Mg, etc) during the cell charge/discharge cycles through chemical/physical sorption and/or electroplating mechanisms.

Alternatively, the cathode current collector or anode current collector in this dual electroplating cell is a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nano-wire mat, surface-passivated porous metal, porous conductive polymer film, conductive polymer nano-fiber mat or paper, conductive polymer foam, carbon foam, carbon aerogel, carbon xerogel, graphene foam, graphene oxide foam, reduced graphene oxide foam, or a combination thereof. These porous and electrically conductive materials are capable of capturing and storing metal ions (Li, Mg, etc) through chemical/physical sorption or electroplating mechanisms. The electroplating mechanism appears to dominate if only the conductive material is present in the current collector (without a carbon or graphene coating).

FIG. 2(A) illustrates another example of the DEC cell containing a porous anode current collector wherein the first metal was pre-coated onto the surfaces of this current collector through electro-plating, sputtering, vapor phase coating, chemical vapor deposition, metal melt coating, etc. This is a schematic showing a possible structure of this new type of rechargeable cell when it is made (prior to the first discharge cycle). Illustrated in FIG. 2(B) is the structure of this cell after its first discharge operation during which the coated metal (e.g., Li, Mg, Zn, K, etc) is ionized or dissolved to release massive metal ions into liquid electrolyte. These metal ions diffuse to the cathode side where they are captured by massive surfaces of the cathode current collector. FIG. 2(C) shows the structure of this DEC device after being re-charged. Metal ions are released from the cathode current collector surfaces, diffusing through liquid electrolyte to reach the anode side of the cell and electrochemically deposited onto the massive surfaces of the anode current collector.

Particularly useful metal foams include copper foam, stainless steel foam, nickel foam, titanium foam, and aluminum foam. The fabrication of metal foams is well known in the art and a wide variety of metal foams are commercially available. Preferably, the surfaces of metallic foams are coated with a thin layer of carbon or graphene because carbon and graphene are more electrochemically inert and will not get dissolved during the charge/discharge cycles of the DEC. Hence, carbon-coated metal foam, graphene-coated metal foam, carbon-coated metal web or screen, graphene-coated metal web or screen, carbon-coated porous metal sheet, graphene-coated porous metal sheet, carbon-coated metal-fiber mat, graphene-coated metal-fiber mat, carbon-coated metal nanowire mat, and graphene-coated metal nano-wire mat are preferred current collector materials for use in the DEC. Also particularly useful are carbon foam, carbon aerogel, carbon xerogel, graphene foam, graphene oxide foam, and reduced graphene oxide foam. These foams may be reinforced with a binder resin, conductive polymer, or CNTs to make a current collector of good structural integrity.

Figure 3:
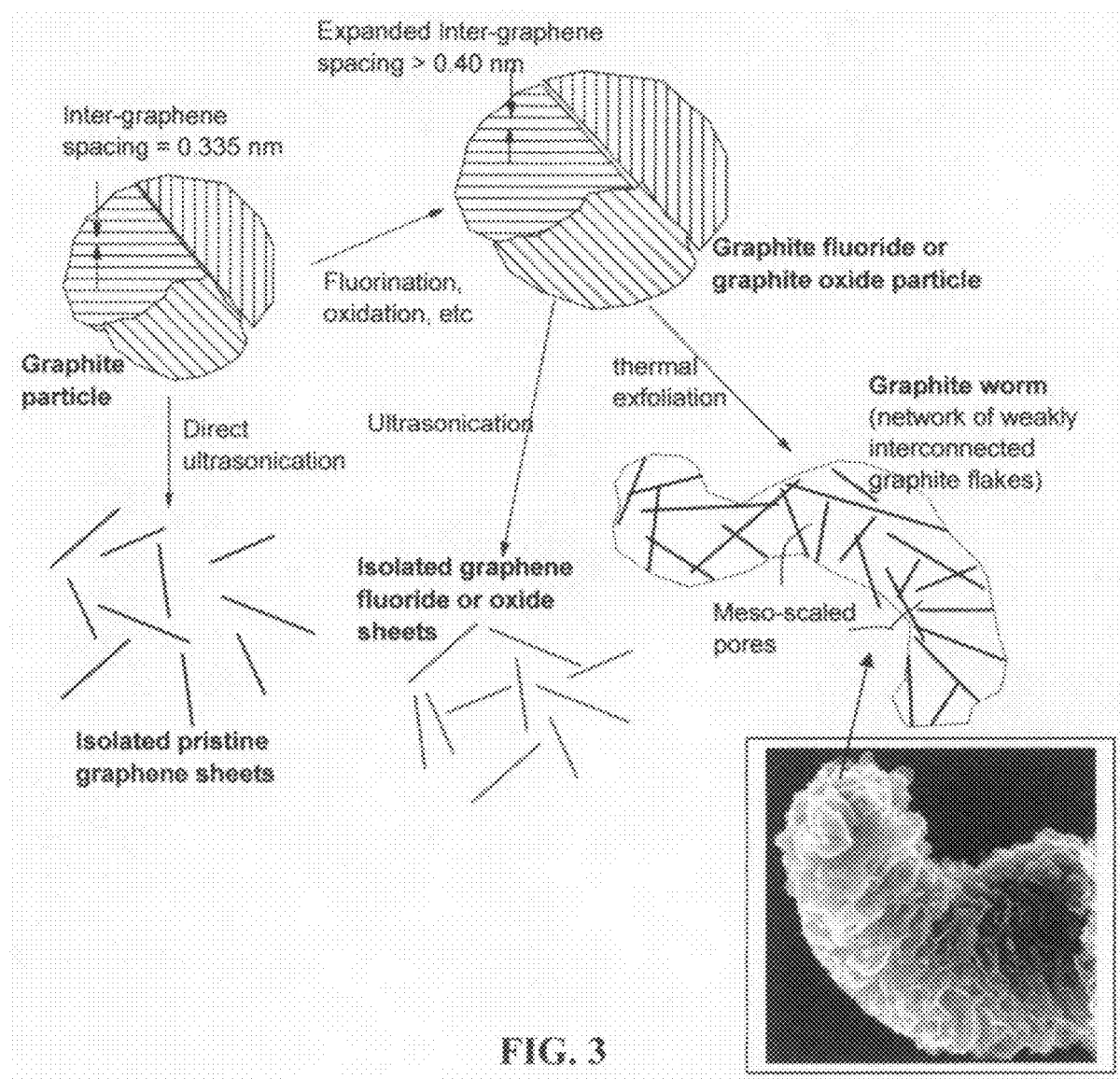
FIG. 3 Schematic of selected procedures for producing pristine graphene sheets, graphite oxide or graphite fluoride (with an expanded inter-graphene spacing), and exfoliated graphite (graphite worms) from natural or artificial graphite.

Highly porous graphitic or carbonaceous materials may be used to make a current collector. Particles of these materials may be bonded by a binder to form a porous current collector. They may be coated onto surfaces of a highly porous metal framework with large pores, such as a metal foam, web, or screen, which serves as a backbone for a current collector. The combined hybrid structure is preferably very porous with a specific surface area significantly greater than 100 $m^2/g$. These types of graphitic or carbonaceous materials are further described below:

As schematically illustrated in FIG. 3, a natural or artificial graphite particle is typically composed of several graphite crystal grains or crystallites (3 being shown) with each crystallite made up of multiple graphene planes bonded via van der Waals forces in the c-direction (a direction perpendicular to the graphene plane). The inter-graphene plane spacing, $d_{002}$ as measured by X-ray diffraction, is typically from 0.335 nm (natural graphite) to 0.337 (artificial graphite). Graphite particles, without any chemical intercalation, oxidation, fluorination, etc, can be dispersed in water containing a surfactant and the resulting suspension subjected to high-power ultrasonic wave treatment to produce pristine graphene, a process commonly referred to as direct ultrasonication or liquid phase production. The resulting pristine graphene sheets are relatively defect-free and exhibit exceptional thermal conductivity and electric conductivity.

Alternatively, as illustrated in the upper-right portion of FIG. 3, graphite particles may be subjected to an oxidation treatment, fluorination treatment (or other types of halogenation or chemical expansion treatments), or intercalation (e.g. in a mixture of sulfuric acid and nitric acid) to produce graphite oxide (GO), graphite fluoride (GF), or graphite intercalation compound (GIC). The GO, GF, or GIC may be subsequently subjected to an ultrasonication treatment to exfoliate/separate graphene planes, forming isolated (separated) graphene oxide or graphene fluoride sheets. Alternatively, the GO, GF, or GIC may be subsequently subjected to a thermal exfoliation treatment (typically in a temperature of 150-1200° C., more typically 650-1050° C.) to obtain exfoliated graphite (or graphite worms). A graphite worm is a worm-like, highly porous structure composed of networks of weakly interconnected graphite flakes and/or graphene sheets. Two SEM images of graphite worms are presented in FIGS. 4(A) and (B).

A mass of graphite worms may be roll-pressed to obtain a flexible graphite sheet, which may be used as a solid (relatively non-porous) current collector in a conventional lithium-ion battery. However, such a prior art flexible graphite sheet is relatively pore-free on the sheet surface and could not be penetrated by liquid electrolyte. Further, the constituent graphite flakes are compressed and re-stacked together and, hence, are not accessible by liquid electrolyte. The specific surface area of the conventional flexible graphite sheet is typically much <10 $m^2/g$. Furthermore, the flexible graphite sheet itself has a very low lithium storage capability (typically <<100 mAh/g) and, hence, has not been considered a suitable anode active material.

By contrast, we have found a way to preserve the porous characteristics of graphite worms. Without breaking up the links between constituent graphite flakes of a worm, graphite worms may be lightly impregnated with a binder resin, which is cured or solidified to impart structural integrity to the worms (which are otherwise very fluffy and weak). The curing or solidifying procedure may be conducted while the graphite worm mass is under a light and controlled pressure. The resulting mass is an integral sheet of porous graphite worm foam with a high specific surface area (typically >100 $m^2/g$ and more typically >200 $m^2/g$). The resin binder may be optionally carbonized to further increase the conductivity of the graphite worm foam and its ability to capture metal ions on graphite flake surfaces.

Graphite worms, as exfoliated (without a binder), may be optionally subjected to mechanical shearing (e.g. air-jet milling) to produce graphite flakes. These flakes would have a thickness >100 nm, if the original graphite has received insufficient oxidation, fluorination, or intercalation treatment prior to the thermal exfoliation step. These flakes can become nano graphene platelets (NGPs) with a thickness <100 nm and more typically <10 nm (including multi-layer graphene platelets or single-layer graphene sheets, as thin as 0.34 nm) if the original graphite has been heavily oxidized, fluorinated, or intercalated. The graphite worms or the isolated graphene platelets/sheets (NGPs) may be further subjected to a chemical activation or etching treatment to generate more defects or pores therein or thereon. A plurality of NGPs may be re-constituted into various porous structures or morphologies (e.g. porous graphene sphere, curved graphene sheets, wrinkled graphene, etc) having a pore size in the range of 2 to 50 nm when they are aggregated and bonded together. The resulting porous structure having a high specific surface area makes a good current collector, which is also capable of storing large amounts of metal on graphene surfaces.

In particular, the cathode or anode current collector of the presently invented DEC preferably contains single-layer sheets or multi-layer platelets of graphene, graphene oxide, graphene fluoride, hydrogenated graphene, nitrogenated graphene, pristine graphene, doped graphene, boron doped graphene, nitrogen doped graphene, chemically treated graphene, reduced graphene oxide, functionalized graphene or graphene oxide, chemically etched or activated graphene, or a combination thereof. Preferably, multiple sheets or platelets are combined to form a meso-porous structure having a pore size in the range of 2 nm to 50 nm, most preferably having a majority of the pores sized between 2 nm and 10 nm.

Nitrogenated graphene, nitrogen-doped graphene, or boron-doped graphene can be produced from chemical synthesis, chemical vapor deposition (CVD), or ion implantation. For instance, nitrogen-doped graphene can be produced from CVD using $CH_4$ as a carbon source, $NH_3$ as a nitrogen source, nano-scaled Cu/Ni particles (or Cu, Ni, or Cu/Ni, foil) as a catalyst. Boron-doped graphene can be produced by boron ion implantation.

Figure 5:
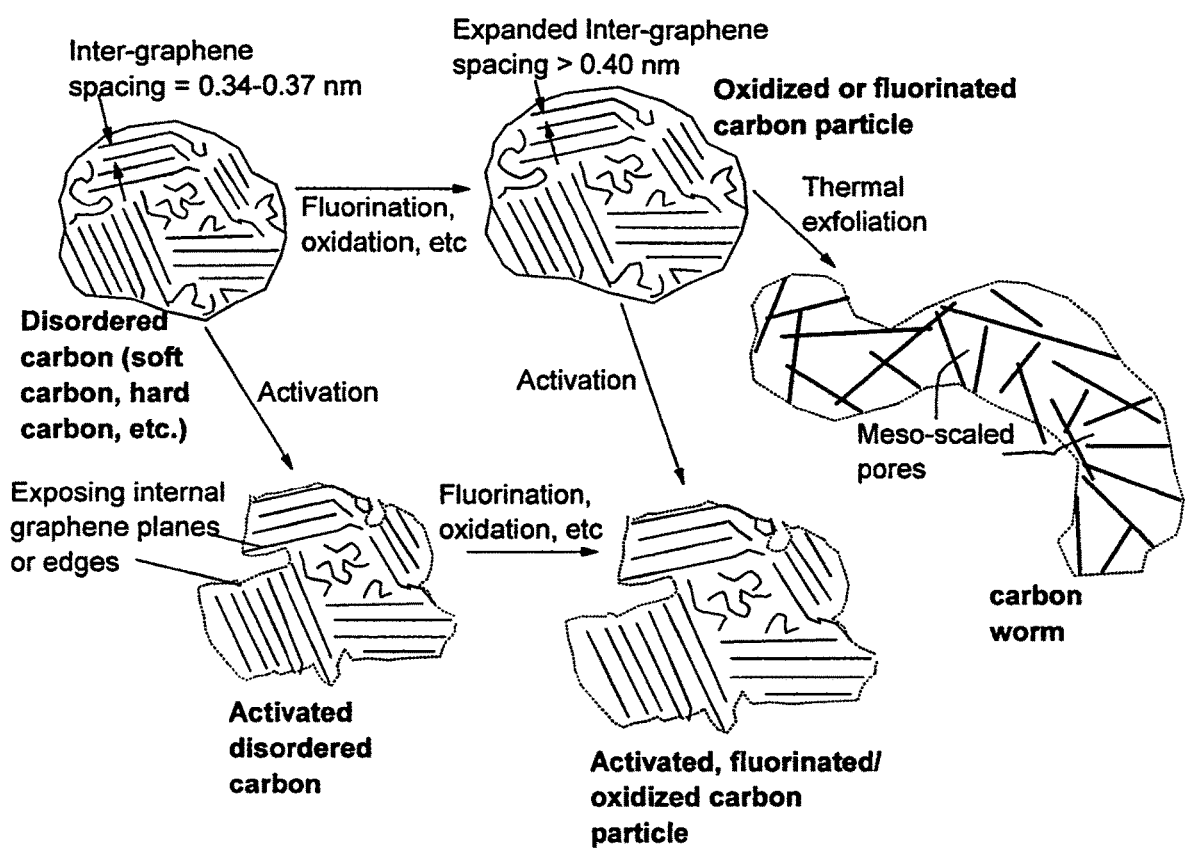
FIG. 5 Schematic of selected procedures for producing activated disordered carbon, oxidized or fluorinated carbon (with an expanded inter-graphene spacing), exfoliated carbon (carbon worms), and activated/expanded carbon from disordered carbon.

In addition to graphite, many carbonaceous materials (e.g. disordered carbon, such as soft carbon, hard carbon, carbon black, carbonized resin, coke, meso-phase pitch or carbon, etc) can be used to form a desired meso-porous structure as a current collector. These carbon materials all have one thing in common: they all have graphene planes (or smaller aromatic ring domains) dispersed in an amorphous carbon matrix. Although not as large in length/width as those in natural graphite, the graphene planes in soft carbon, for instance, are much larger than in carbon black. The edges or primary surfaces of these graphene planes can be made to be exposed to liquid electrolyte in a battery cell if some of the amorphous carbon material is chemically etched away or "activated" and/or if the inter-graphene spacing in the graphene domain or crystallite is expanded through an oxidation, fluorination, halogenation, or intercalation treatment, as illustrated in FIG. 5.

Figure 6:
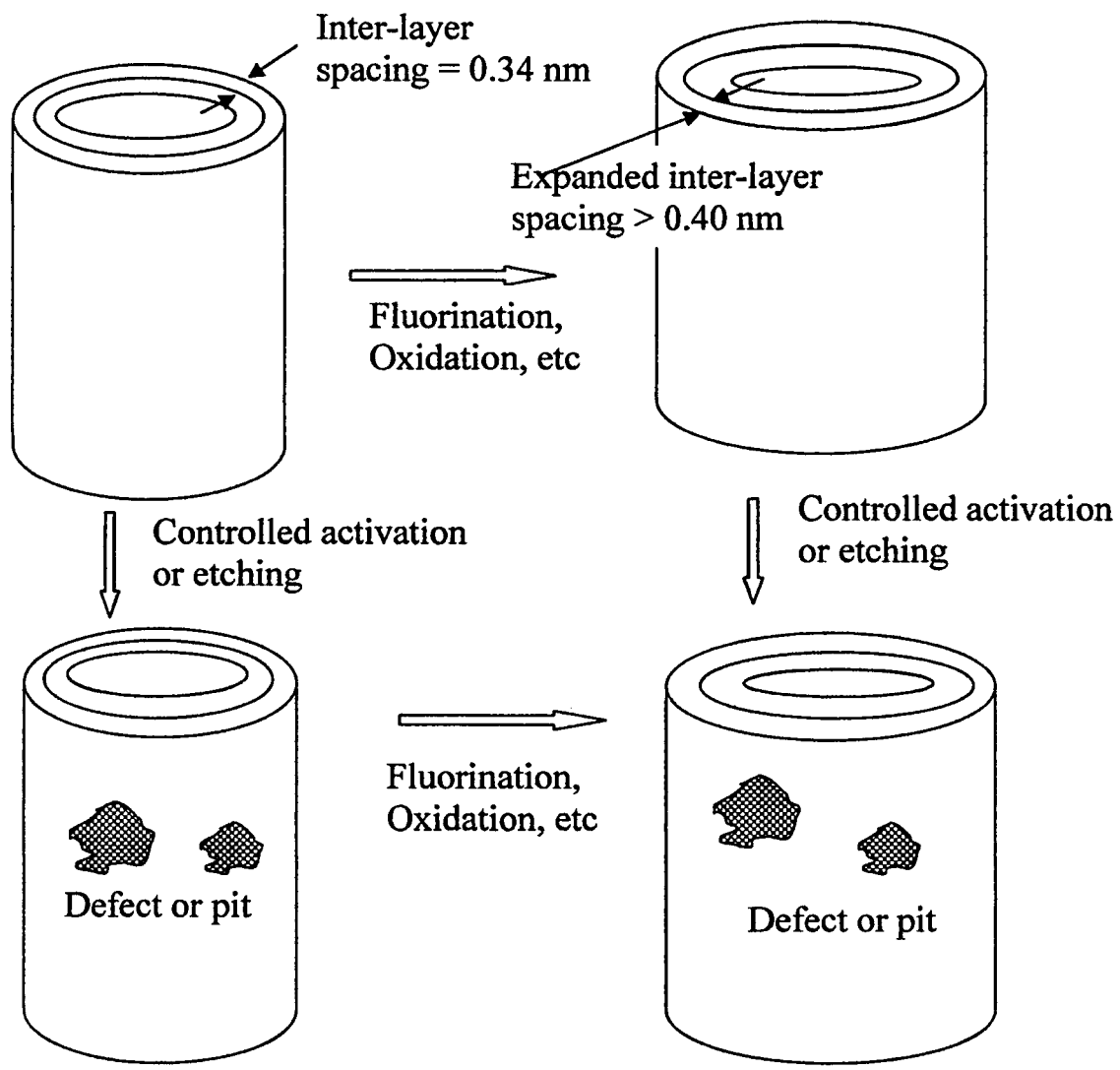
FIG. 6 Schematic of selected procedures for producing activated carbon nanotubes, oxidized or fluorinated CNTs with an expanded inter-graphene spacing, and activated/expanded CNTs from multi-walled CNTs.

Alternatively, the current collector in a DEC may contain a single-wall carbon nanotube or multi-wall carbon nanotube. Further preferably, carbon nanotubes are subjected to doping, ion implementation, chemical etching, fluorinating treatment, halogen treatment, heavy oxidation, or chemical treatment to generate defects to the cylindrical graphene layers that constitute the nanotube and/or to increase the spacing between cylindrical graphene planes from the original spacing of approximately 0.34 nm to an expanded spacing of greater than 0.4 nm, preferably greater than 0.5 nm, further preferably greater than 0.6 nm. This procedure is schematically illustrated in FIG. 6. Chemical etching helps to create channels for metal ion migration to enter additional places inside a CNT structure. We have found that expanded inter-graphene layer spacing in multi-walled CNTs can significantly increase the metal ion-capturing capacity of a current collector. It is desirable to pack treated carbon nanotubes into a meso-porous electrode current collector structure having a pore size in the range of 2 nm to 50 nm, most preferably having a majority of the pores sized between 2 nm and 10 nm.

Figure 4C:
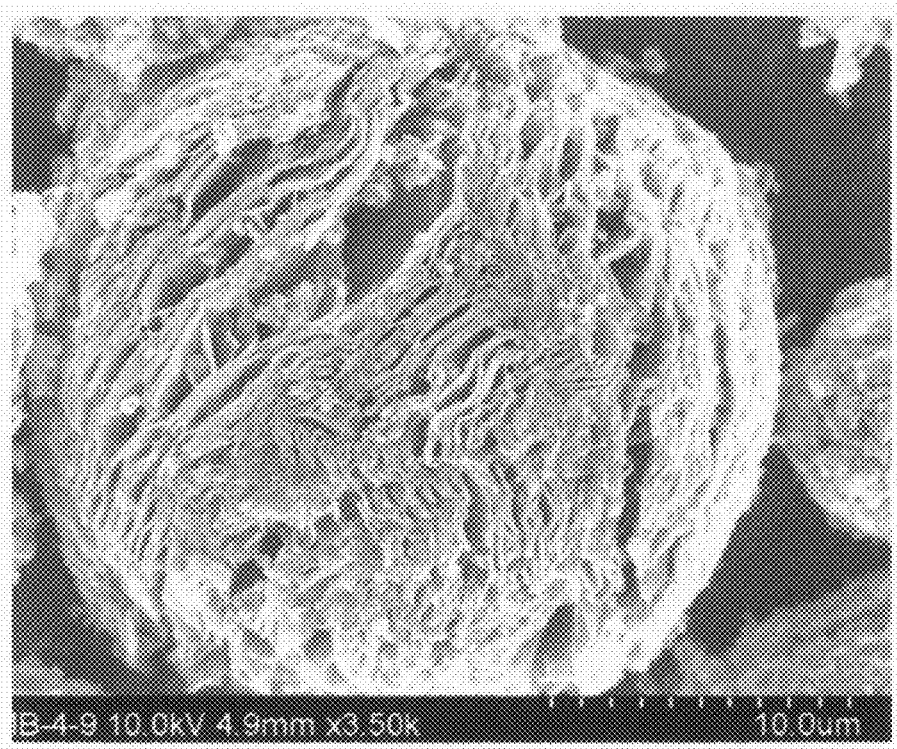
Figure 4D:
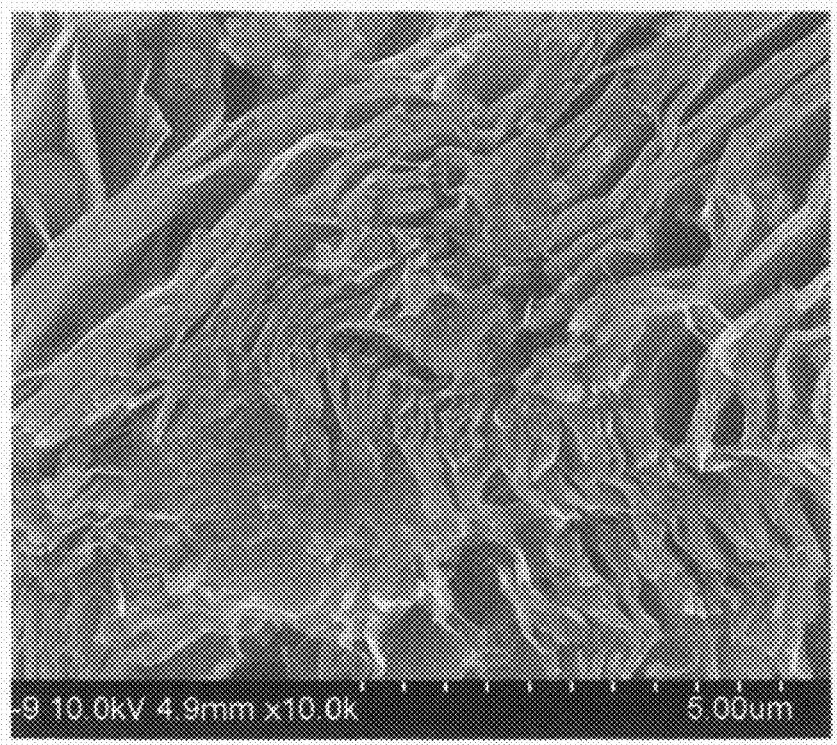
Figure 4E:
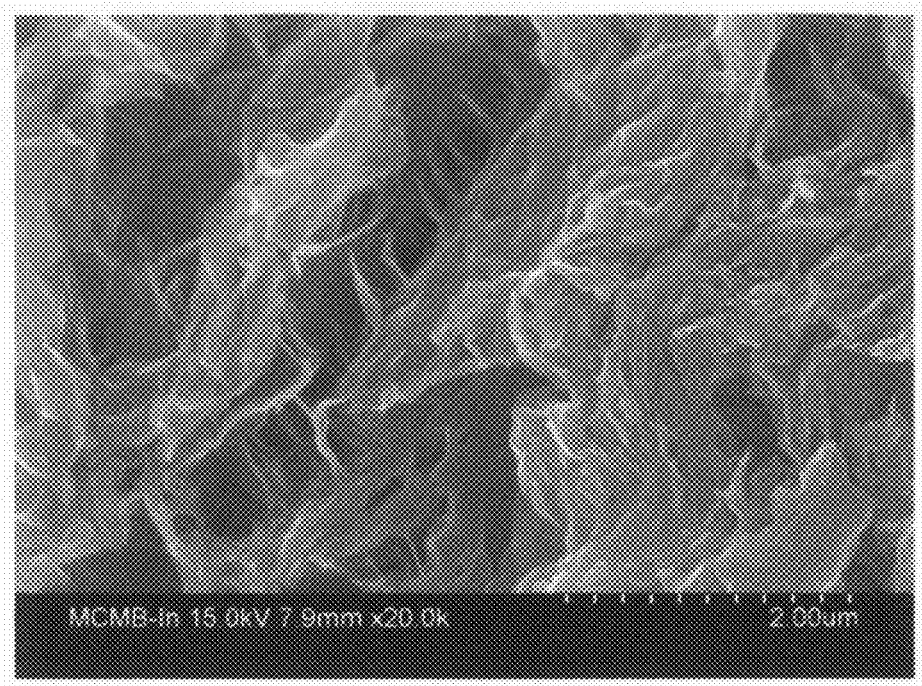
Figure 4F:
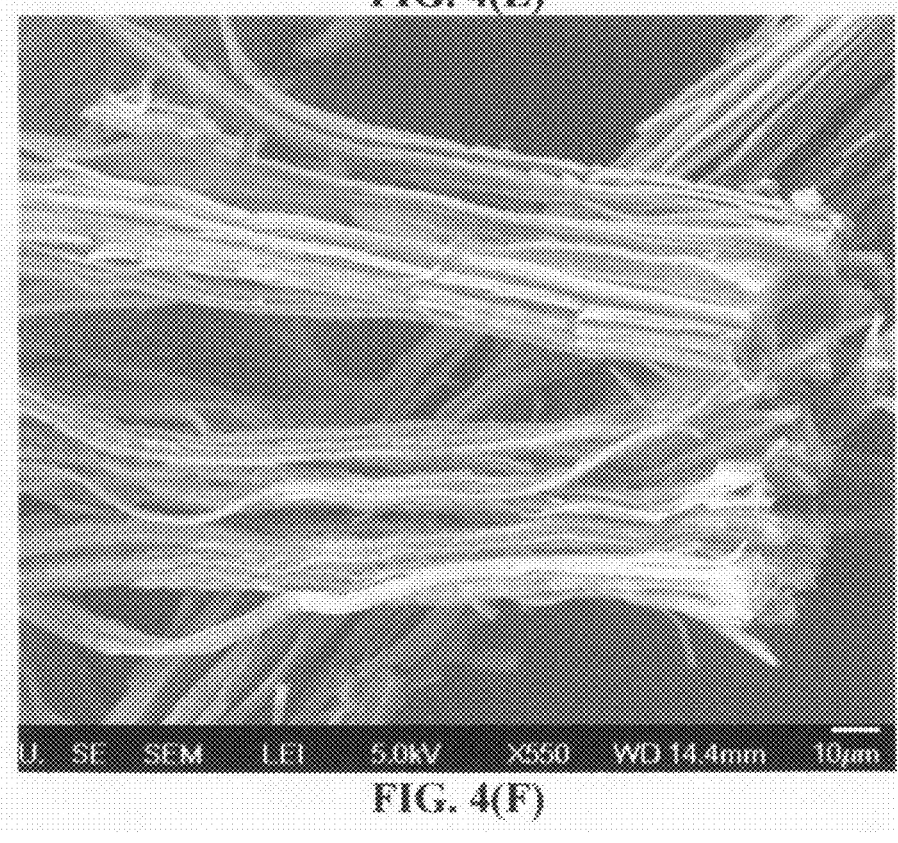
Figure 4G:
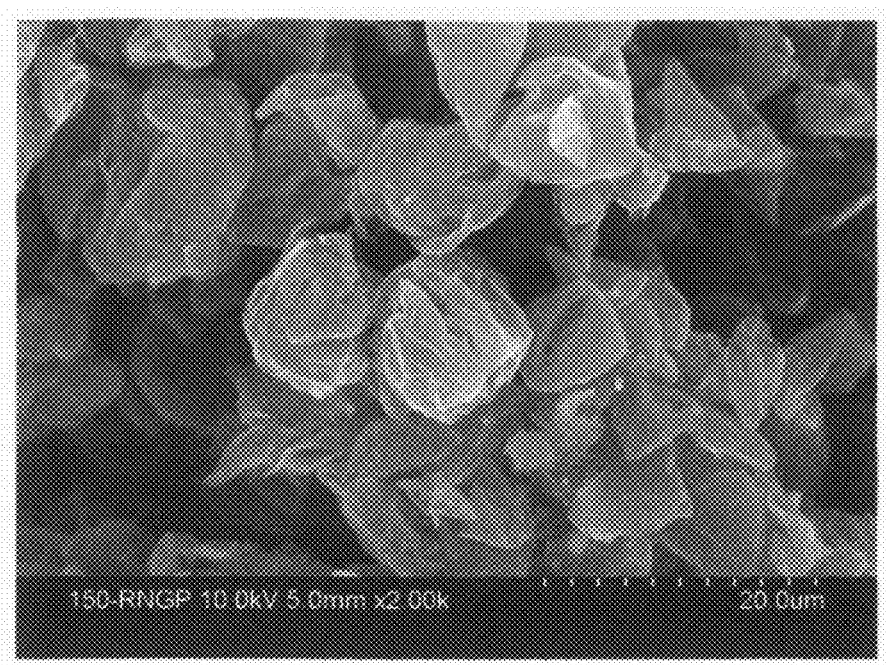

Shown in FIG. 4(C) is an SEM image of a meso-porous graphitic structure prepared by exfoliating a soft carbon. FIG. 4(D) is an SEM image of a meso-porous graphitic structure prepared by chemically etching or expanding a hard carbon material Presented in FIG. 4(E) is an SEM image of an expanded MCMB and FIG. 4(F) is an SEM image of expanded carbon fibers. FIG. 4(G) is an SEM image of a meso-porous structure made of graphene sheets re-constituted into an approximately spherical shape. These materials are suitable current collector materials when they are consolidated into an integral structure; e.g., aggregated and bonded by a binder to form a porous layer having a specific surface area of at least 100 $m^2/g$.

The meso-scaled pores (2-50 nm, preferably 2-10 nm) allow the entry of electrolyte, exposing more carbon-hexagon planes (aromatic rings or graphene planes) in the meso-porous graphitic or carbonaceous material to the electrolyte. This is advantageous because these pores enable a greater amount of surface areas to be in physical contact with electrolyte and capable of capturing metal ions directly from the electrolyte. These metal ions thus do not have to travel to these planes or surfaces through otherwise very slow internal solid-state diffusion. Such an arrangement surprisingly leads to a very high energy density as well as high power density. These surface areas are typically and preferably >100 $m^2/g$, more preferably >500 $m^2/g$, further more preferably >1,000 $m^2/g$, and most preferably >1,500 $m^2/g$.

In summary, graphite crystals in a graphitic or carbonaceous material contain well-packed and stacked graphene planes having an inter-graphene plane spacing of approximately 0.34 nm. We have experimentally observed that, by oxidizing or fluorinating the graphite crystals one can increase the inter-graphene spacing to >0.40 nm, more typically >0.50 nm, and most typically >0.60 nm. We have further observed that these expanded graphite crystals with extra spaces between graphene planes and perhaps modified bonding energetics are more conducive to accommodating great amounts of metal atoms/ions when used as a current collector. The procedures for creating the graphite, carbon material, and carbon nanotube with expanded inter-graphene spacing ($d_{002}$) are presented in FIGS. 3, 5, and 6, respectively. In these drawings, we also illustrate the chemical activation or etching treatment to further improve the metal ion storage capability of a variety of carbon and graphite materials via creation of meso-scaled pores (2-50 nm).

The DEC further contains a porous separator disposed between the anode and the cathode current collector; a first metal ion-containing electrolyte in physical contact with the two current collectors; and a first metal ion source disposed in at least one of the two current collectors (preferably the anode current collector) when the cell is made. There are several ways with which one can implement a desired amount of the first metal in a current collector:

(1) The pores or surfaces of a current collector can be pre-deposited with a thin layer of first metal (prior to the fabrication of a DEC cell) through electrochemical plating, sputtering, chemical vapor deposition, physical vapor deposition, metal melt impregnation, chemical impregnation, liquid solution deposition, etc.

(2) Powder containing the first metal may be lodged in large pores of a current collector.

(3) Several types of discrete metal ion sources may be implemented to provide the metal ions that are needed for shuttling between the anode current collector and the cathode current collector in a DEC device. Examples of the metal ion sources are metal chip, metal alloy chip, metal foil, metal alloy foil, metal powder, metal alloy powder, metal particles, metal fibers or rods, or a combination thereof. The metal ion source may be formed into a layer that is brought in contact with the anode current collector when the DEC cell is made.

(4) The pre-impregnation step can be carried out prior to the production of a DEC cell, or after the cell is made, for instance, by bringing the intended anode current collector in direct contact with a piece of magnesium or lithium foil in the presence of an electrolyte liquid to effect "pre-magnesiation" or "pre-lithiation".

To further illustrate the operational principle of this new high-capacity energy storage device, one may consider a case wherein a first metal ion source (e.g. small pieces of magnesium or lithium foil) is implemented between an anode current collector (e.g. comprising graphite fluoride particles having an expanded inter-graphene spacing of 0.72 nm or expanded carbon nanotubes, and conductive additives bonded together by a resin) and a porous polymer separator when the DEC device is made, and wherein a porous cathode comprises graphene sheets or graphite worms re-constituted into more or less spherical particles having large surface areas capable of capturing and storing metal ions thereon. The cathode current collector structure contains pores that are preferably meso-scaled (2 nm-50 nm), but can be larger than 50 nm (e.g. in graphite worms). It may be noted that the electrolyte typically contains some metal salt (containing desired metal ions, $M^{+n}$) when the cell is made. In principle, one can begin to electrochemically "form" (activate) the cell by taking a first step of charging the cell, effectively driving the pre-existing $M^{+n}$ ions to the anode current collector side. However, we have found that this is not the best practice. Instead, it is preferred that the cell is prescribed to undergo a discharging step first, instead of charging, as the electrochemical formation step. This has resulted in a significantly higher cathode capacity and cell energy density, a completely unexpected result.

Referring to FIG. 2(A)-(C), during the first discharge operation, metal particles (using Mg as an example) are ionized to generate Mg ions which are released into the liquid electrolyte. These Mg ions rapidly migrate through the pores of the polymer separator into the cathode side. Since the cathode current collector is also porous having interconnected pores to accommodate liquid electrolyte therein, Mg ions basically just have to sail through liquid to reach an active site on a surface or edge of a graphite flake or graphene sheet at the cathode current collector. The graphite flake surface or graphene sheet is in direct contact with electrolyte and readily accepts Mg ions from the electrolyte. One can discharge the cell to the extent that the cell shows a voltage level (the first LVL), with this first LVL preferably higher than 0.1 volts, more preferably higher than 0.5 volts, and most preferably higher than 0.75 volts. After this electrochemical formation step, the cell can then be charged to an upper voltage level (herein referred to as the second UVL) and then discharged to a second LVL. Subsequently, the cell may be cycled between a LVL and a UVL.

Because all the initial electrochemical formation steps (magnesium ionization or dissolution, liquid phase diffusion, and surface trapping/capturing) are fast and no solid-state diffusion is required, the whole process is very fast, enabling fast discharging of the cell and a high power density.

In the above example, the discharge process continues until either the magnesium particles are completely ionized or all the active sites on the cathode current collector are occupied by magnesium atoms, or when a desired LVL is reached. During re-charge, magnesium ions are released from the surfaces of the cathode current collector, diffuse through liquid electrolyte, and electrochemically plate onto surfaces of an anode current collector.

Again using Mg as an example of the first metal, the surfaces of a porous cathode current collector are capable of capturing Mg ions directly from a liquid electrolyte phase and storing magnesium atoms on the surfaces in a reversible and stable manner. There is no need to have a separate cathode active material. This is a completely new electrochemistry that has never been discovered by anybody other than our research group. All other research groups have selected some kinds of Mg intercalation compounds (e.g. $MgMnSiO_4$) or conversion compound (e.g. sulfur) as a cathode active material in a magnesium cell. Similarly, in all prior art lithium metal or lithium-ion cells, there is always an additional cathode active material (e.g. lithium iron phosphate) used in combination with a cathode current collector (porous or not).

During the discharge process, metal ions are released from the anode current collector, and the graphitic or carbonaceous material surfaces of the cathode current collector continue to absorb metal ions from the liquid electrolyte and store metal on these surfaces, maintaining a low metal ion content in the liquid electrolyte, lower than or equal to the corresponding metal ion solubility limit in the liquid. This process continues until the active surface sites of the cathode current collector are saturated with metal, or metal ions from the anode have been exhausted, or when the cell voltage reaches a desired or pre-set LVL. This saturation limit can be many times greater than the metal ion solubility limit in the liquid electrolyte provided the specific surface area of the cathode current collector is sufficiently high (e.g. higher than 100 $m^2/g$). Such a high metal amount captured on cathode current collector surfaces implies a high energy density.

The cathode current collector has a high specific surface area (>100 $m^2/g$, preferably >500 $m^2/g$) that is in direct contact with the electrolyte (e.g. being directly immersed in electrolyte) and surprisingly capable of capturing many types of metal ions from the electrolyte and storing the metal atoms in the surface active sites or simply electroplating on current collector surfaces. There has been no prior art teaching about this capability of current collector surfaces. Preferably, the cathode current collector preferably forms a meso-porous structure having a pore size in the range of 2 nm and 50 nm, enabling easy entry of liquid electrolyte into the porous interior of a graphitic material particle and exposing surface active sites to metal ion-containing electrolyte. Preferably, the cathode has a specific surface area no less than 500 $m^2/gram$ (preferably >1,000 $m^2/gram$, and more preferably >1,500 $m^2/gram$) to store or support metal ions or atoms thereon.

It has been commonly believed that a high specific surface area is an undesirable feature of either an anode or a cathode for a lithium-ion cell or Mg-ion cell based on the belief that a higher surface area leads to the formation of more solid-electrolyte interface (SEI), a common cause of capacity irreversibility or capacity loss. We have herein defied this expectation and discovered that the porous graphitic current collector can be a superior cathode or anode current collector material for storing metal ions in a DEC, which could operate thousands of cycles without any significant capacity decay. This is so in spite of or despite of the notion that both graphite and carbon materials, when used as an anode active material in a Li-ion cell, have serious SEI issue. The successful use of high surface area carbon or graphitic materials in the anode and/or cathode current collector of a DEC is truly unexpected.

Even more surprisingly, the porous carbonaceous or graphitic materials, when incorporated as an integrated cathode current collector, having a specific surface area greater than 100 $m^2/g$ and a pore size from 2 to 50 nm, exhibit a specific capacity significantly higher than that of any commonly used magnesium ion cell cathode or any lithium ion cell cathode.

In an embodiment of the present invention, one may choose to add a conductive additive and/or a binder material (e.g. binder resin or carbonized resin) to form a current collector of structural integrity. The conductive additive or filler may be selected from any electrically conductive material, but is advantageously selected from graphite or carbon particles, carbon black, expanded graphite, graphene, carbon nanotube, carbon nano-fiber, carbon fiber, conductive polymer, or a combination thereof. The amount of conductive fillers is preferably no greater than 30% by weight based on the total collector weight, preferably no greater than 15% by weight, and most preferably no greater than 10% by weight. The amount of binder material is preferably no greater than 15% by weight, more preferably no greater than 10%, and most preferably no greater than 5% by weight.

Although there is no limitation on the current collector thickness, the current collector of the presently invented DEC device preferably has a thickness from 10 μm to 300 μm, and more preferably from 20 to 200 μm.

In one preferred embodiment, the porous carbonaceous or graphitic material of a DEC current collector may be produced by using the following recommended procedures:

(a) dispersing or immersing a graphitic or carbonaceous material (e.g., powder of natural graphite, artificial graphite, meso-phase carbon, meso-carbon micro bead (MCMB), soft carbon, hard carbon, coke, polymeric carbon (carbonized resin), activated carbon (AC), carbon black (CB), multi-walled carbon nanotube (MWCNT), carbon nano-fiber (CNF), carbon or graphite fiber, meso-phase pitch fiber, and the like) in a mixture of an intercalant and/or an oxidant (e.g., concentrated sulfuric acid and nitric acid) and/or a fluorinating agent to obtain a graphite intercalation compound (GIC), graphite oxide (GO), graphite fluoride (GF), or chemically etched/treated carbon material;

(b) exposing the resulting GIC, GO, GF, or chemically etched/treated carbon material to a thermal shock, preferably in a temperature range of 600-1,100° C. for a short period of time (typically 15 to 60 seconds) to obtain exfoliated graphite or graphite worms; and optionally (c) subjecting the resulting graphite worms to air jet milling to obtain expanded graphite (with graphite flakes thicker than 100 nm).

Alternatively, after step (a) above, the resulting GIC, GO, GF, or chemically etched/treated carbon/graphite material is subjected to repeated rinsing/washing to remove excess chemical. The rinsed products are then subjected to a drying procedure to remove water. The dried GO, GF, chemically treated CB, chemically treated AC, chemically treated MWCNT, chemically treated CNF, chemically treated carbon/graphite/pitch fiber can be used as a constituent material of a DEC current collector. These chemically treated carbonaceous or graphitic materials can be further subjected to a heat treatment at a temperature preferably in the range of 150-1,100° C. for the purposes of thermally reducing the oxidized material, thermally exfoliating/expanding the carbonaceous/graphitic material (for increasing inter-planar spacing and changing the bonding environment between two hexagonal carbon planes or graphene planes), and/or creating meso-scaled pores (2-50 nm) to enable the interior structure being accessed by metal ion-carrying electrolyte. It may be noted that these interior graphene planes can remain stacked and interconnected with one another, but the above-described chemical/thermal treatments facilitate direct access of these interior graphene planes by metal ion-carrying electrolyte. Multiple particles of these treated materials may be bonded by a binder material to form a current collector. These highly porous graphitic or carbonaceous particles, optionally along with a binder, may be lodged into large pores of a highly porous metal backbone, such as a metal foam.

The broad array of carbonaceous materials, such as a soft carbon, hard carbon, polymeric carbon (or carbonized resin), meso-phase carbon, coke, carbonized pitch, carbon black, activated carbon, or partially graphitized carbon, are commonly referred to as the disordered carbon material. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable.

Hard carbon refers to a carbonaceous material composed of small graphite crystals wherein these graphite crystals or stacks of graphene planes inside the material are not oriented in a favorable directions (e.g. nearly perpendicular to each other) and, hence, are not conducive to further merging of neighboring graphene planes or further growth of these graphite crystals or graphene stacks (i.e., not graphitizable).

Carbon black (CB) (including acetylene black, AB) and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc). These materials per se (without chemical/thermal treatments as described above) are not good candidate cathode materials for the presently invented high-capacity Mg-ion cells. Hence, preferably, they are subjected to further chemical etching or chemical/thermal exfoliation to form a meso-porous structure having a pore size in the range of 2-50 nm (preferably 2-10 nm). These meso-scaled pores enable the liquid electrolyte to enter the pores and access the graphene planes inside individual particles of these carbonaceous materials.

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to a chemical etching/expanding treatment using a process commonly used to produce activated carbon (e.g., treated in a KOH melt at 900° C. for 1-5 hours). This chemical treatment is intended for making the disordered carbon meso-porous, enabling electrolyte to reach the edges or surfaces of the constituent aromatic rings after a battery cell is made. Such an arrangement enables the lithium ions in the liquid electrolyte to readily attach onto exposed graphene planes or edges without having to undergo significant solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce isolated meso-phase particles or spheres commonly referred to as meso-carbon micro-beads (MCMBs), which can be further carbonized and graphitized.

Preferred electrolyte types include liquid electrolyte, gel electrolyte, polymer electrolyte, solid electrolyte, ionic liquid electrolyte (preferably containing metal salts dissolved therein), or a combination thereof.

It is of paramount significance for us to point out the following facts and observations: In a rechargeable lithium metal cell, the surface films (commonly referred to as SEI films) formed on lithium in polar aprotic electrolyte solutions are usually Li ion-conducting, allowing Li ions to enter or leave during repeated charge/discharge cycles. In stark contrast, the surface films formed on magnesium in the same types of electrolyte solutions are not capable of conducting the bivalent Mg ions. Consequently, during the intended cell discharge, electrochemical dissolution of Mg in most of the commonly used polar aprotic solutions has to occur at relatively high overpotential through a mechanism that involves a breakdown of the surface films. During the subsequent re-charging step, the electrochemical deposition of magnesium on Mg electrodes covered by passivating thin films is practically impossible to accomplish.

After three decades of research and development efforts, battery scientists could only partially address this issue by using a very limited number of electrolyte systems in designing their Mg-ion cells. These include ethereal solutions of Grignard reagents, $Mg(BR_2R'_2)_2$ (R, R'=alkyl or aryl groups), $Mg(AX_{4-n}R_nR'_n)_2$ complexes (A=Al, B, Sb, P, As, Fe, and Ta, X=Cl, Br, and F, R, R'=alkyl or aryl groups, $0<n<4$, n'+n"=n), or amido-magnesium halides, Mg ion-conducting molten salts, and Mg-doped polymeric electrolytes. The limited selection of usable electrolyte systems has been the single most critical issue that has impeded the commercialization of Mg-ion cells. By contrast, the last 30 years have witnessed an explosive growth of Li-ion cells that have permeated into just about any device that requires power. The limited selection of suitable electrolytes for Mg cells has been most unfortunate and undesirable for several non-trivial reasons:

(1) As of now, none of these electrolytes, such as ethereal solutions of Grignard reagents, are commercially available. One cannot even buy these electrolytes, not to mention buy them with a reasonable price. This is a serious impediment to the initiation and growth of Mg metal or Mg-ion cell industry that potentially offers a much safer battery than Li metal and Li-ion cells.

(2) These known electrolytes are far from being ideal for any cathode-anode combination of a Mg-ion cell. A battery designer has no reliable guidelines to follow in terms of choosing an electrolyte composition when a new anode or cathode active material is identified. One would not know if a SEI layer would be formed on the surface of this intended new electrode material and, if it does form, whether this layer is conductive to Mg ions or not.

(3) A narrow selection of suitable electrolytes would also severely limit the choice of electrode materials.

Most unexpectedly, the use of the presently disclosed porous carbon/graphite materials as an active anode current collector overcomes this long-standing, most challenging issue of conventional rechargeable Mg-ion cells. Even for this reason alone, our invention will have a profound and far-reaching effect on the emergence of a vibrant Mg-ion battery industry. We have further observed that these same materials, when used as an integrated current collector/active material for essentially all types of metal ions, do not have any SEI-related issues. This is a major discovery by itself.

A wide range of electrolytes can be used for practicing the instant invention. Most preferred are non-aqueous liquid, polymer gel, and ionic liquid electrolytes although other types can be used. The non-aqueous electrolyte to be employed herein may be produced by dissolving an electrolytic salt of a desirable metal ion or more than one type of ions (e.g. salt of combined $Na^+$ and $K^+$) in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a nano-structured carbonaceous material; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent.

Preferred second solvents are dimethyl carbonate (DMC), methylethyl carbonate (MEC), diethyl carbonate (DiEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent may be selected so that the viscosity of this second solvent is 28 cps or less at 25° C. Actually, these solvents can be used as a primary solvent with or without EC.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC and MB; comprising EC, PC and MEC; comprising EC, MEC and DiEC; comprising EC, MEC and DMC; and comprising EC, MEC, PC and DiEC; with the volume ratio of MEC being controlled within the range of 30 to 80%. By selecting the volume ratio of MEC from the range of 30 to 80%, more preferably 40 to 70%, the conductivity of the solvent can be improved.

The electrolytic salts to be incorporated into a non-aqueous electrolyte may be selected from a lithium salt, sodium salt, potassium salt, calcium salt, magnesium salt, zinc salt, titanium salt, any transition metal salt, aluminum salt, etc. Examples are lithium perchlorate ($LiClO_4$), sodium perchlorate ($NaClO_4$), potassium perchlorate ($KClO_4$), lithium hexafluorophosphate ($LiPF_6$), sodium hexafluorophosphate ($NaPF_6$), potassium hexafluorophosphate ($KPF_6$), transition metal hexafluorophosphate, aluminum hexafluorophosphate ($Al(PF_6)_3$), lithium borofluoride ($LiBF_4$), sodium borofluoride ($NaBF_4$), potassium borofluoride ($KBF_4$), calcium borofluoride ($Ca(BF_4)_2$), aluminum borofluoride ($Al(BF_4)_3$), transition metal borofluoride, alkaline-earth metal borofluoride, lithium hexafluoroarsenide ($LiAsF_6$), other alkali metal hexafluoroarsenides, transition metal hexafluoroarsenides, other metal hexafluoroarsenides, lithium trifluoro-metasulfonate ($LiCF_3SO_3$) and bis-trifluoromethyl sulfonylimide lithium [$LiN(CF_3SO_2)_2$]. Among them, $NaPF_6$, $NaBF_4$, $KPF_6$, $KBF_4$ and $NaN(CF_3SO_2)_2$ are preferably used in a sodium ion- or potassium ion-exchanging battery device. $NaPF_6$, $NaBF_4$, $KPF_6$, and $KBF_4$ are preferably used in a sodium ion- or potassium ion-exchanging battery device. $NaPF_6$, $NaBF_4$, $KPF_6$, and $KBF_4$, and/or an alkaline-earth metal borofluoride are preferably used in an alkaline-earth metal ion-exchanging battery device. $Al(BF_4)_3$, $NaPF_6$, $NaBF_4$, $KPF_6$, and $KBF_4$, are preferably used in an aluminum ion-exchanging battery device, etc. The content of aforementioned electrolytic salts in the non-aqueous solvent is preferably 0.5 to 2.0 mol/l.

The following examples serve to illustrate the preferred embodiments of the present invention and should not be construed as limiting the scope of the invention:

Example 1

Meso-Porous Soft Carbon

Chemically etched or expanded soft carbon was prepared from heat-treating a liquid crystalline aromatic resin (50/50 mixture of anthracene and pyrene) at 200° C. for 1 hour. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting chemically etched or expanded soft carbon was dried by heating at 60° C. in a vacuum for 24 hours. This material can be used in both the anode and cathode current collectors of a DEC cell due to its high specific surface area and ability to capture and store metal atoms on its surfaces. These surfaces were found to be particularly suitable for capturing and storing ions of Li, K, Na, Mg, Ca, and Zn.

Example 2

Expanded "Activated Carbon" (E-AC)

Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was then dried in a vacuum oven pre-set at 70° C. for 24 hours. The dried sample was then placed in a tube furnace at 1,050° C. for 2 minutes to obtain expanded AC. This material can be used in both the anode and cathode current collectors of a DEC cell due to its high specific surface area and ability to capture and store metal atoms on its surfaces. These surfaces were found to be particularly suitable for capturing and storing ions of Li, K, Na, Mg, Al, Ti, and Zn.

Example 3

Chemically Treated (Expanded) Needle Coke

Anisotropic needle coke has a fully developed needle-shape texture of optical anisotropy. Volatile species of the raw coke was estimated to be around 5 wt. %. Activation was carried out using KOH in a reaction apparatus that consisted of a stainless steel tube and a nickel sample holder. KOH activation was carried out at 800° C. for 2 h under Ar flow. The coke/KOH ratio was varied between 1/1 and 1/4. Upon cooling, the alkali-rich coke was washed with hot water until the outlet water reached a pH value of 7. The resulting chemically etched or expanded coke was dried by heating at 60° C. in a vacuum for 24 hours.

Example 4

Chemically Treated (Expanded) Petroleum Pitch-Derived Hard Carbon

A pitch sample (A-500 from Ashland Chemical Co.) was carbonized in a tube furnace at 900° C. for 2 hours, followed by further carbonization at 1,200° C. for 4 hours. KOH activation was carried out at 800° C. for 2 h under Ar flow to open up the internal structure of pitch-based hard carbon particles.

Example 5

Chemically Activated Meso-phase Carbon and Production of Fluorinated Carbon

Meso-carbon carbon particles (un-graphitized MCMBs) were supplied from China Steel Chemical Co. This material has a density of about 2.2 g/cm$^3$ with a median particle size of about 16 μm. This batch of meso-phase carbon was divided into two samples. One sample was immersed in $K_2CO_3$ at 900° C. for 1 h to form chemically activated meso-carbon. The chemically activated meso-phase carbons showed a BET specific surface area of 1,420 m$^2$/g. This material can be used in both the anode and cathode current collectors of a DEC cell due to its high specific surface area and ability to capture and store metal atoms on its surfaces. These surfaces were found to be particularly suitable for capturing and storing ions of Li, K, Na, Mg, and Zn.

The other sample was subjected to a fluorination treatment. The meso-phase carbon particles were mixed with a PVDF binder in a NMP solution and coated onto an Al foil to form an electrode sheet. This electrode sheet was used as a working electrode in an electrochemical fluorination treatment apparatus consisting of a PTFE beaker, a Pt plate counter electrode, a Pd wire as a reference electrode, and $(C_2H_5)_3N$-3HF as electrolyte. The fluorination procedure was carried out at room temperature by potential sweeping from −1.0 V to 1.0 V at a 20 mV/s scan rate. X-ray diffraction data indicate that the inter-graphene spacing has been increased from 0.337 nm to 0.723 nm.

Example 6

Graphitic Fibrils from Pitch-based Carbon Fibers

Fifty grams of graphite fibers from Amoco (P-55S) were intercalated with a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. The sample was then submitted to a mechanical shearing treatment in a Cowles (a rotating-blade dissolver/disperser) for 10 minutes. The resulting graphitic fibrils were examined using SEM and TEM and their length and diameter were measured.

Example 7

Expanded Multi-walled Carbon Nanotubes (MWCNTs)

Fifty grams of MWCNTs were chemically treated (intercalated and/or oxidized) with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds.

Example 8

Graphene Oxide from Sulfuric Acid Intercalation and Exfoliation of MCMBs

Meso-carbon micro beads (MCMBs), after graphitization, were supplied from China Steel Chemical Co. This material has a density of about 2.24 g/cm$^3$ with a median particle size of about 16 MCMB (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours.

Part of the dried powder sample was placed in a quartz tube and inserted into a horizontal tube furnace pre-set at a desired temperature of 800° C. for 30 seconds to obtain exfoliated artificial graphite or graphite worms. A small quantity of each sample was mixed with water and ultrasonicated at 60-W power for 10 minutes to obtain a suspension. A small amount was sampled out, dried, and investigated with TEM, which indicated that most of the NGPs were between 1 and 10 layers. The graphene-water suspension was used for subsequent preparation of a graphene cathode current collector.

The remaining dried sample was essentially artificial graphite oxide having an expanded inter-graphene spacing of 0.62 nm. This oxidized graphite was used as a material of an anode current collector and that of a cathode current collector for a DEC. The MCMB particles without the chemical expansion treatment were also bonded by a PVDF binder to form an anode current collector and a cathode current collector for use in a conventional dual graphite cell as a baseline sample for comparison purposes.

Particles of un-treated MCMB, MCMB with expanded inter-graphene spacing (E-MCMB), and exfoliated graphite worms from MCMB (EG-MCMB) were separated mixed with 5% acetylene black particles as a conductive additive and 7% PVDF binder to form three slurry samples. Each type of slurry was used to impregnate the large pores of a highly aluminum foam and, separately, the pores of a Ni foam to form a cathode current collector and an anode current collector, respectively. Subsequently, the dried current collector layers were separately cut into disks (diameter=12 mm) for inclusion in a button cell.

In the cell containing a non-lithiated MCMB, E-MCMB, or EG-MCMB anode current collector, a thin sheet of lithium foil (as a lithium ion source) was attached to the anode current collector surface and a piece of porous separator was, in turn, stacked on top of the lithium foil. A piece of the non-lithiated MCMB, E-MWCNT, or EG-MCMB was used as a cathode current collector to form a CR2032 coin-type cell. Celgard 2400 membrane was used as a separator, and 1 M $LiPF_6$ electrolyte solution dissolved in a mixture of ethylene carbonate (EC) and diethyl carbonate (DiEC) (EC-DiEC, 1:1 v/v) was used as cell electrolyte. The cell assembly was performed in an argon-filled glove-box. The CV measurements were carried out using a CHI-6 electrochemical workstation at a scanning rate of 1 mV/s.

Figure 7:
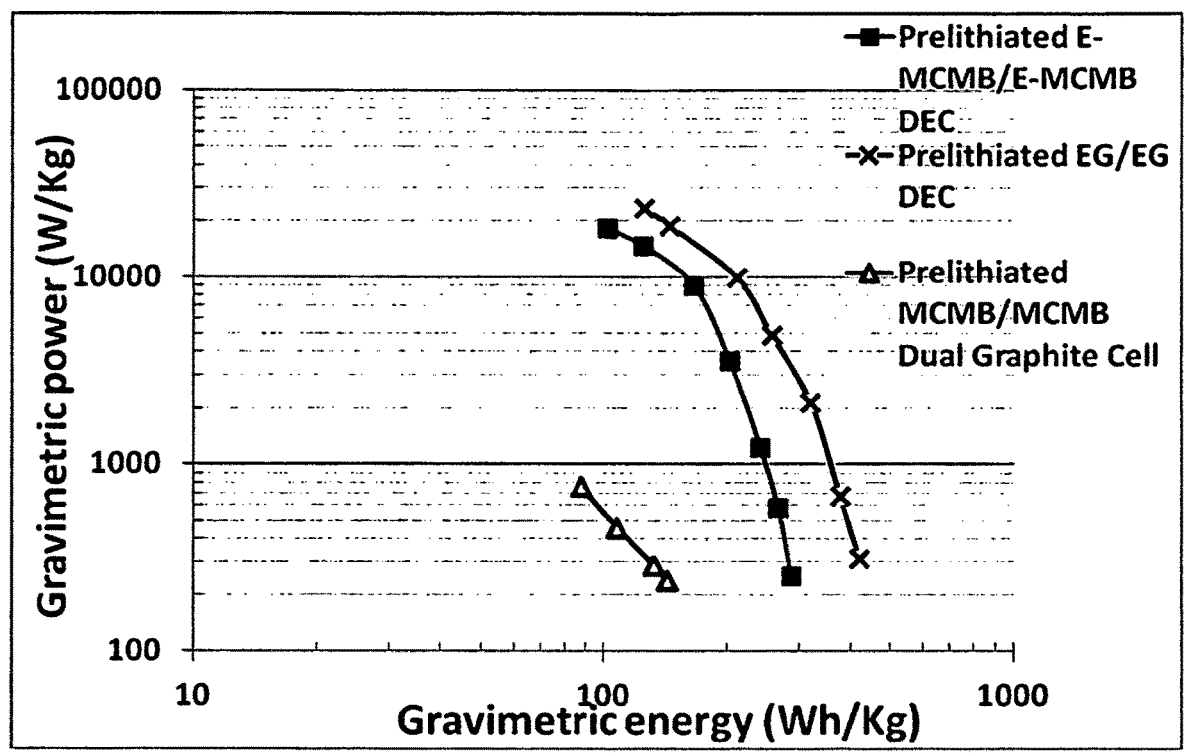
FIG. 7 The Ragone plots of three types of electrochemical cells: (i) a DEC with E-MCMB current collectors (MCMB with an expanded inter-graphene spacing), (ii) a DEC with current collectors composed of exfoliated graphite worms from MCMB, and (iii) a conventional dual graphite cell containing un-treated but prelithiated MCMB anode current collector and un-treated MCMB cathode current collector.

The Ragone plots of three types of electrochemical cells are shown in FIG. 7. The E-MCMB current collector-based DEC device of the present invention is capable of storing an energy density of 287 Wh/kg, higher than those of all commercially available Li-ion cells and that (143 Wh/kg) of the control dual graphite cell containing un-treated but prelithiated MCMB anode current collector and un-treated MCMB cathode current collector. The E-MCMB based DEC device is also capable of delivering a power density of 18 kW/kg, comparable to those of the best symmetric supercapacitors. Furthermore, this value is more than one order of magnitude higher than those of conventional Li-ion cells and the baseline MCMB-based dual graphite cell. This is a very stunning result.

The results are even more impressive if the E-MCMB (oxidized MCMB) is exfoliated to form artificial graphite worms that are bonded with a binder to form highly porous current collectors (EG-MCMB cell). A cell-level energy density of 423 Wh/kg is an absolutely exceptional value that tops the energy densities of all Li-ion cells ever reported thus far.

Example 9

Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 6. The intent was to remove most of the sulfuric and nitric acid residue out of graphite interstices. The slurry was dried and stored in a vacuum oven at 60° C. for 24 hours to produce graphite oxide (GO) or expanded-spacing graphite (E-Gr) with expanded inter-graphene spacing of 0.63 nm.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes to obtain graphene oxide sheets (mostly single-layer). The resulting suspension of GO sheets was then heated, atomized, and dried to form re-constituted spherical particles of graphene sheets. This material can be used in both the anode and cathode current collectors of a DEC cell due to its high specific surface area and ability to capture and store metal atoms on its surfaces. These surfaces were found to work for all alkali, alkaline earth, and transition metals that have a relatively negative electrochemical potential with respect to the hydrogen standard electrode and particularly suitable for capturing and storing ions of Li, K, Na, Mg, Ca, Ti, and Zn.

Figure 8:
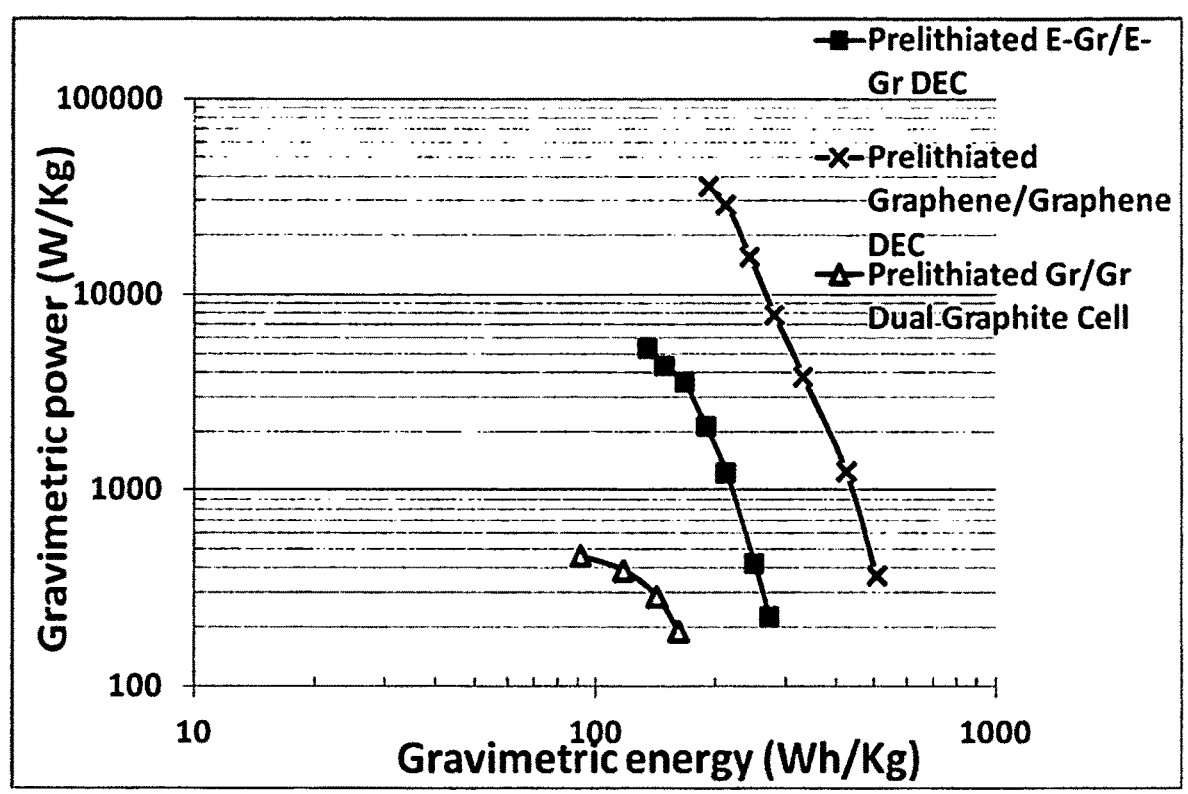
FIG. 8 The Ragone plots of 3 types of cells: (i) a DEC with E-Gr current collectors (E-Gr=treated natural graphite with expanded inter-graphene spacing >0.4 nm), (ii) a DEC with current collectors composed of graphene sheets from natural graphite, and (iii) a conventional dual graphite cell containing un-treated but prelithiated natural graphite anode current collector and un-treated natural graphite cathode current collector.

The Ragone plots of three types of electrochemical cells are shown in FIG. 8. The E-Gr current collector-based DEC cell of the present invention is capable of storing an energy density of 272 Wh/kg, higher than those of all commercially available Li-ion cells and that (162 Wh/kg) of the control dual graphite cell containing un-treated but prelithiated natural graphite anode current collector and un-treated natural graphite cathode current collector. The E-Gr based DEC device is also capable of delivering a power density of 5.3 kW/kg, comparable to those of the symmetric supercapacitors (but with an energy density 45-50 times higher than those of supercapacitors). Furthermore, this power density value is one order of magnitude higher than those of conventional Li-ion cells and the baseline natural graphite-based dual graphite cell. This is also a highly surprising result that could not have been anticipated by prior art teachings.

The results are further more impressive if the E-Gr (oxidized graphite with expanded inter-graphene distance) is exfoliated to form artificial graphite worms that are separated to form graphene sheets (prelithiated graphene/graphene DEC). A cell-level energy density of 507 Wh/kg is an absolutely unheard of value that tops the energy densities of all reported Li-ion cells. The power density of 3.5 kW/kg, comparable to those of the best symmetric supercapacitors; this was achieved with a maximum energy density that is 80-100 times higher than those (5-6 Wh/kg) of symmetric supercapacitors.

Example 10

Direct Ultrasonication of Natural Graphite to Produce Pristine Graphene

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The dried material can be used in both the anode and cathode current collectors of a DEC cell due to its high specific surface area and ability to capture and store metal atoms on its surfaces. These surfaces were found to be particularly suitable for capturing and storing ions of Li, K, Na, Mg, Ca, Ti, and Zn.

Example 11

Prelithiated Anode Current Collector Made of Chemically Expanded MWCNT (E-MWCNT) and E-MWCNT Based Cathode Current Collector The working electrodes (for use as a current collector) were prepared by mixing 92 wt % E-MWCNT prepared in Example 7) and 8 wt % polyvinylidene fluoride (PVDF, 5 wt % solid content) binder dissolved in N-methyl-2-pyrrolidinoe (NMP) to form a slurry-like mixture. After the slurry was cast on a glass surface, the layer was dried at 120° C. in vacuum for 2 h to remove the solvent before pressing. The specific surface area of the expanded MWCNT-based current collector is approximately 172 m$^2$/g. The E-MWCNT layer prepared was divided into two pieces: one piece was for use as a non-prelithiated current collector and the other piece was prelithiated electrochemically by following the procedure described below:

The second piece of the E-MWCNT layer was immersed in a liquid electrolyte prepared by dissolving 1 M LiPF$_6$ electrolyte solution in a mixture of ethylene carbonate (EC) and diethyl carbonate (DEC) (EC-DEC, 1:1 v/v). A piece of lithium foil was used as a counter-electrode, which was also immersed in the electrolyte. Direct current was used to charge the E-MWCNT layer electrode until an amount of lithium equivalent to approximately 970 mAh/g based on the E-MWCNT weight was inserted into E-MWCNT. The prelithiation procedure was performed in an argon-filled glove-box.

Subsequently, the lithiated and non-lithiated layers were separately cut into disks (diameter=12 mm) for use as an anode current collector. In the cell containing a non-lithiated E-MWCNT anode current collector, a thin sheet of lithium foil (as a lithium ion source) was attached to the anode current collector surface and a piece of porous separator was, in turn, stacked on top of the lithium foil. A piece of the non-lithiated E-MWCNT was used as a cathode current collector to form a CR2032 coin-type cell. Celgard 2400 membrane was used as separator, and 1 M LiPF$_6$ electrolyte solution dissolved in a mixture of ethylene carbonate (EC) and diethyl carbonate (DiEC) (EC-DiEC, 1:1 v/v) was used as cell electrolyte. The cell assembly was performed in an argon-filled glove-box. The CV measurements were carried out using a CHI-6 electrochemical workstation at a scanning rate of 1 mV/s.

Comparative Example 11A

A Cell with a Prelithiated Non-Expanded MWCNT Anode Current Collector and a Non-Expanded MWCNT Cathode Current Collector For comparison, a cell using a non-expanded MWCNT cathode current collector was prepared. This cell contains a layer of non-treated MWCNT as an anode current collector, and a piece of lithium foil as a lithium source. The specific surface area of these non-expanded MWCNT-based current collectors is approximately 37 m$^2$/g.

Figure 9:
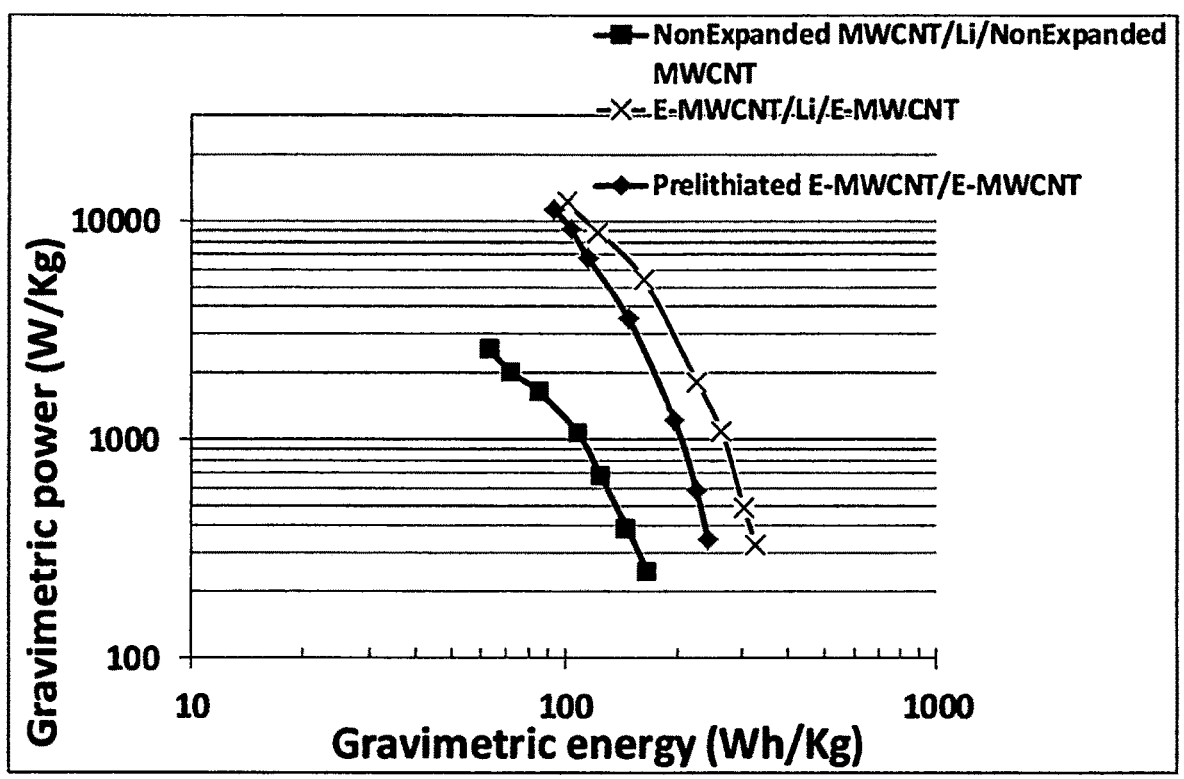
FIG. 9 The Ragone plots of three types of electrochemical cells: (i) a DEC with E-MWCNT current collectors (anode current collector being prelithiated), (ii) a DEC with current collectors composed of E-MWCNT (no prelithiation, but with a piece of Li foil as a metal ion source in contact with the anode current collector when the cell is made), and (iii) a conventional dual CNT cell containing un-treated but prelithiated MWCNT anode current collector and un-treated MWCNT cathode current collector.

The Ragone plots of three types of electrochemical cells are shown in FIG. 9. The DEC device with an E-MWCNT anode current collector, a Li foil as the metal ion source, and an E-MWCNT cathode current collector is capable of storing an energy density of 328 Wh/kg. This is double the value of a cell containing a prelithiated unexpanded CNT anode and an unexpanded CNT cathode current collector. This cell is also capable of delivering a power density of 12 kW/kg, comparable to those of the best symmetric supercapacitors. Furthermore, this value is more than one order of magnitude higher than those of conventional Li-ion cells. Outstanding results are also achieved with a corresponding DEC having a prelithiated E-MWCNT anode current collector and E-MWCNT cathode current collector. These are very significant discoveries. The expansion of inter-layer spaces in a MWCNT appears to have enabled easy and ready access of the interior graphene planes by metal ions (Li ions in this example).

Example 12

Preparation of Graphene-Coated Metal Foams

The suspension of graphene oxide (GO) sheets dispersed in water, obtained by a procedure similar to that described in Example 9, was used to prepare graphene or graphene oxide coated metal foams. Foams of Ni, Cu, Al, stainless steel, etc. are commercially available in various sheet thicknesses. Individual sheets of metal foam were dipped into and withdrawn from GO suspension at a constant speed of from 10 to 200 mm/min. Upon removal of water in a vacuum oven, individual graphene oxide sheets were found to naturally bond and wrap around thin pore skeleton. The resulting GO-coated metal foam can be thermally reduced at a temperature from 100-900° C. for 0.5 to 3 hours to obtain reduced graphene oxide (RGO) coated metal foam. These coated surfaces were found to work well for the DECs based on all alkali, alkaline earth, and transition metals that have a relatively negative electrochemical potential with respect to the hydrogen standard electrode and particularly suitable for capturing and storing ions of Li, K, Na, Mg, Ca, Ti, and Zn.

Example 13

Preparation of Graphene Foam via Freeze Drying

The suspension of graphene oxide (GO) sheets dispersed in water, obtained by a procedure similar to that described in Example 9, was used to prepare graphene or graphene oxide foam. A water solution of polyethylene oxide (PEO, 1% by wt.) was added to the GO suspension, and portion of water in the resulting suspension was removed to obtain a slurry that had a solid content of approximately 20-70% by wt. The slurry was then frozen with water gradually sublimed and removed to form a highly porous solid, which could be optionally compressed to a desired extent. The PEO-bonded GO foam was then subjected to a carbonization treatment at 200-700° C. for 0.5-2 hours to convert PEO into carbon and, concurrently, reduce GO sheets to become porous carbon-bonded RGO sheets. The surfaces of the RGO foam were found to work well as a DEC current collector for all alkali, alkaline earth, and transition metals that have a relatively negative electrochemical potential with respect to the hydrogen standard electrode and particularly suitable for capturing and storing ions of Li, K, Na, Mg, Ca, Ti, and Zn.

Example 14

Preparation of Electrolytes for Mg Metal-Based Cells

The preparation procedure for electrolyte solution of 0.25 mol/L Mg(AlCl$_2$EtBu)$_2$/THF is briefly described as follows: Proper amounts of MgBu$_2$ solution (1 M in hexane) and AlEtCl$_2$ solution (1 M in heptane) in the ratio of 1:2 were mixed at room temperature, and a white solid precipitation was formed immediately. After stirring for 48 h, the hexane and heptane were completely evaporated, and a proper amount of high purity tetrahydrofuran (THF, distilled with benzophenone containing sodium chips under argon protection) was added to form the desired 0.25 mol/L solution. All chemical preparations were carried out in an argon-filled glovebox.

Other electrolytes used in the present study include $MgCl_2/AlCl_3$/1-ethyl-methyl-imidazolium chloride (EMIC), 1 mol/L $Mg(ClO_4)_2$ solution in tetrahydrofuran (THF), and 0.1 mol/L $Mg(ClO_4)_2$/PC. It may be noted that these three electrolytes (and most of other electrolytes being considered for use in Mg-ion cells) have been known to form a thick and rigid passivating layer on Mg film that is not Mg ion conductive, preventing Mg dissolution during the cell discharge. Since the passivating layer is electronically insulating, it is also difficult for the re-deposition of Mg to occur during the cell re-charging step. We have surprisingly observed that this long-standing, very challenging issue can be overcome by pre-depositing Mg atoms on the massive surfaces of graphene sheets or other meso-porous graphitic materials herein disclosed. Instead of using a Mg foil directly attached to a current collector at the anode, we chose to deposit a layer of Mg atoms on graphene sheets (e.g. using sputtering or electrochemical deposition) prior to implementing this Mg-loaded graphene layer in contact with an anode current collector. This strategy has unexpectedly eliminated the Mg non-dissolution and non-deposition problems since there appears to be no significant surface passivating layer existing on graphene surfaces.

Example 15

Preparation of the Cathode Active Materials ($MgCo_2O_4$ and $Mg_{0.67}Ni_{1.33}O_2$) for Use in a Control Mg-ion Cell As a baseline cathode active material, $MgCo_2O_4$ and $Mg_{0.67}Ni_{1.33}O_2$ samples were synthesized by the inverse co-precipitation method. First, by using $Mg(NO_3)_2$-$6H_2O$ and $Co(NO_3)_2$-$6H_2O$ or $Ni(NO_3)_2$-$6H_2O$ used as starting materials, we prepared the mixed nitrate solution with concentrations of 0.08 mol/L $Mg(NO_3)_2$ and 0.16 mol/L $Co(NO_3)_2$ or $Ni(NO_3)_2$ in deionized water. Sodium carbonate solution of 0.35 mol/L in water was used as the precipitating agent. The solution of mixed nitrates was poured slowly into the sodium carbonate solution at a temperature of 70-80° C. With continued stirring, co-precipitation proceeded at an almost constant pH. The resulting precipitates were filtered, then washed with hot water until nitrate ions disappeared, and subsequently dried at 80° C. The thus obtained precursor was heated at 350° C. for 2 h in air to fully oxidize. The crystal structures of the $MgCo_2O_4$ and $Mg_{0.67}Ni_{1.33}O_2$ samples were confirmed by X-ray diffraction (XRD) with Mo—Kα radiation.

Example 16

Preparation of Control Cathode Active Materials (Magnesium Manganese Silicate, $Mg_{1.03}Mn_{0.97}SiO_4$)

Reagent-grade KCl (melting point=780° C.) was used as flux after drying for 3 h at 150° C. under vacuum. The starting materials were magnesium oxide (MgO), manganese (II) carbonate ($MnCO_3$) and silicon dioxide ($SiO_2$, 15-20 nm) powder. The stoichiometric amounts for the precursor compounds were controlled with the molar ratio of 1.03:0.97:1 for Mg:Mn:Si. The mixture (flux/reactants molar ratio=4) was hand-ground in a mortar by pestle for a 10 minutes, and then poured into a corundum crucible. Then, the powder mixture was dried at 120° C. for 5 h in a vacuum to minimize the water content in the mixture. Subsequently, the mixture was immediately transferred to a tube furnace and heated in a reductive atmosphere (Ar+5 wt % H2) at 350° C. for 2 h to remove carbonate groups. This was followed by final firing at various temperatures at a rate of 2° C./min for 6 h, then cooling to room temperature naturally. Finally, the product was washed three times with deionized water to dissolve any remaining salt, separated by centrifugation, and dried under vacuum at 100° C. for 2 h.

Example 17

Preparation of Baseline Mg-Ion Cells and Mg Metal Based DECs

For the fabrication of Mg-ion cells, the electrodes (either the anode or cathode) were typically prepared by mixing 85 wt % of an electrode active material, 7 wt % acetylene black (Super-P), and 8 wt % polyvinylidene fluoride binder (PVDF, 5 wt % solid content dissolved in N-methyl-2-pyrrolidinoe (NMP)) to form a slurry-like mixture. After coating the slurry on an intended current collector (e.g., Cu foil or stainless steel foil for the anode and Al foil for the cathode), the resulting electrode was dried at 120° C. in vacuum for 2 h to remove the solvent before pressing. In this Mg-ion cell configuration, there are five discrete layers that constitute a unit cell: a discrete layer of anode current collector, a separate layer of anode active material, a porous separator layer, a separate layer of cathode active material, and a discrete layer of cathode current collector.

For the fabrication of DECs, the anode current collector or the cathode current collector was typically prepared by mixing 85 wt % of an electrode active material (e.g. re-constituted graphene particles), 7 wt % acetylene black (Super-P), and 8 wt % polyvinylidene fluoride binder (PVDF, 5 wt % solid content dissolved in N-methyl-2-pyrrolidinoe (NMP)) to form a slurry-like mixture. After coating the slurry on a releasable glass surface, the resulting electrode was dried at 120° C. in vacuum for 2 h to remove the solvent before pressing. The current collector layer was then peeled off from the glass. In this DEC configuration, there are only three discrete layers that constitute a unit cell: a layer of porous anode current collector, a porous separator layer, and a layer of porous cathode current collector.

The pre-magnesiation procedure involves either inserting magnesium atoms or ions into the bulk of an anode current collector material (for a DEC) or an anode active material (for a Mg-ion cell); e.g. graphite fluoride with an expanded inter-graphene spacing. The procedure may entail depositing magnesium onto the surfaces of graphene sheets through electrochemical plating, sputtering, physical deposition, or chemical vapor deposition, etc. For instance, a piece of reduced graphene oxide (RGO) electrode was immersed in the electrolyte solution of 0.25 mol/L $Mg(AlCl_2EtBu)_2$/THF prepared in Example 14. A piece of magnesium foil was used as a counter-electrode, which was also immersed in the electrolyte. Direct current was used to charge the RGO electrode until an amount of magnesium equivalent to approximately 1,000-1,500 mAh/g based on RGO weight was electrochemically deposited onto surfaces of RGO sheets. A similar procedure was employed to intercalate magnesium into the bulk of graphite fluoride (GO) particles. The pre-magnesiation procedure was performed in an argon-filled glove-box.

Subsequently, the magnesiated or non-magnesiated electrode layers were separately cut into disks (diameter=12 mm) for use as an anode current collector in a DEC or as an anode active material in a Mg-ion cell. In the cell containing a non-magnesiated layer, a thin sheet of magnesium foil (as a magnesium source) was attached to the layer surface and a piece of porous separator (e.g., Celgard 2400 membrane) was, in turn, stacked on top of the magnesium foil. A piece of meso-porous cathode current collector (for a DEC) or a layer of carbon or graphitic material coated on a cathode current collector (e.g, Al foil) was used as a cathode (for a Mg-ion cell) and stacked over the separator layer to form a CR2032 coin-type cell. The cell assembly was performed in an argon-filled glove-box. The CV measurements were carried out using a CHI-6 electrochemical workstation at a scanning rate of 1 mV/s. The electrochemical performance of the cells was also evaluated by galvanostatic charge/discharge cycling at a current density of from 50 mA/g to 10 A/g (up to 100 A/g for some cells), using an Arbin and/or a LAND electrochemical workstation.

$Mg(ClO_4)_2$/THF is known to produce a thick and Mg ion-impermeable layer (passivating layer) on the surface of Mg foil or Mg particles used as the anode active material. This layer prevents the dissolution of Mg during the cell discharge due to the Mg ions' inability to diffuse through the layer. This layer, being electrically insulating, also makes it difficult or even impossible for Mg to re-deposit thereon during the cell charging step. This issue is also observed with a conventional Mg cell, which shows a thick and dense inactive layer on Mg foil surface, resulting in a low cathode specific capacity (<23 mAh/g) and low cell-level specific energy (26 Wh/kg).

In contrast, by implementing a meso-porous anode current collector (e.g. re-constituted from graphene sheets or reduced graphene oxide sheets, RGO), we observed a dramatically higher specific capacity and higher specific energy. A close scrutiny of the post-testing cell did not turn out any observable dense passivating layer at the anode. This was a totally un-expected result and the reason for this lack of any observable passivating layer remains unknown.

When the cell was made, a thin Mg foil of a desired mass was pressed against a meso-porous graphene electrode layer, creating a situation where the Mg foil and the graphene layer were essentially "short-circuited," enabling migration of Mg from the Mg foil to the massive graphene surfaces in the presence of a suitable electrolyte (e.g. $Mg(AlCl_2EtBu)_2$/THF). It seems that strong interactions between graphene and Mg have significantly reduced the tendency for Mg to react with the electrolyte, reducing or eliminating the driving force for the formation of a passivating layer.

The ability of a meso-porous carbon or graphitic material implemented as an anode current collector to reduce or eliminate the formation of a dense and thick passivating layer has overcome the longstanding, most difficult problem of the rechargeable magnesium battery. This problem has plagued the development and commercialization of the rechargeable Mg battery for 20+ years even though this type of battery is perceived to be much safer than the Li battery and presumably can have a higher energy density as well. This approach has unexpectedly solved this problem and has dramatically expanded the scope of the electrolytes that can be used for a rechargeable Mg battery. This is applicable to a wide variety of electrolytes, not just $Mg(ClO_4)_2$/THF.

Figure 10:
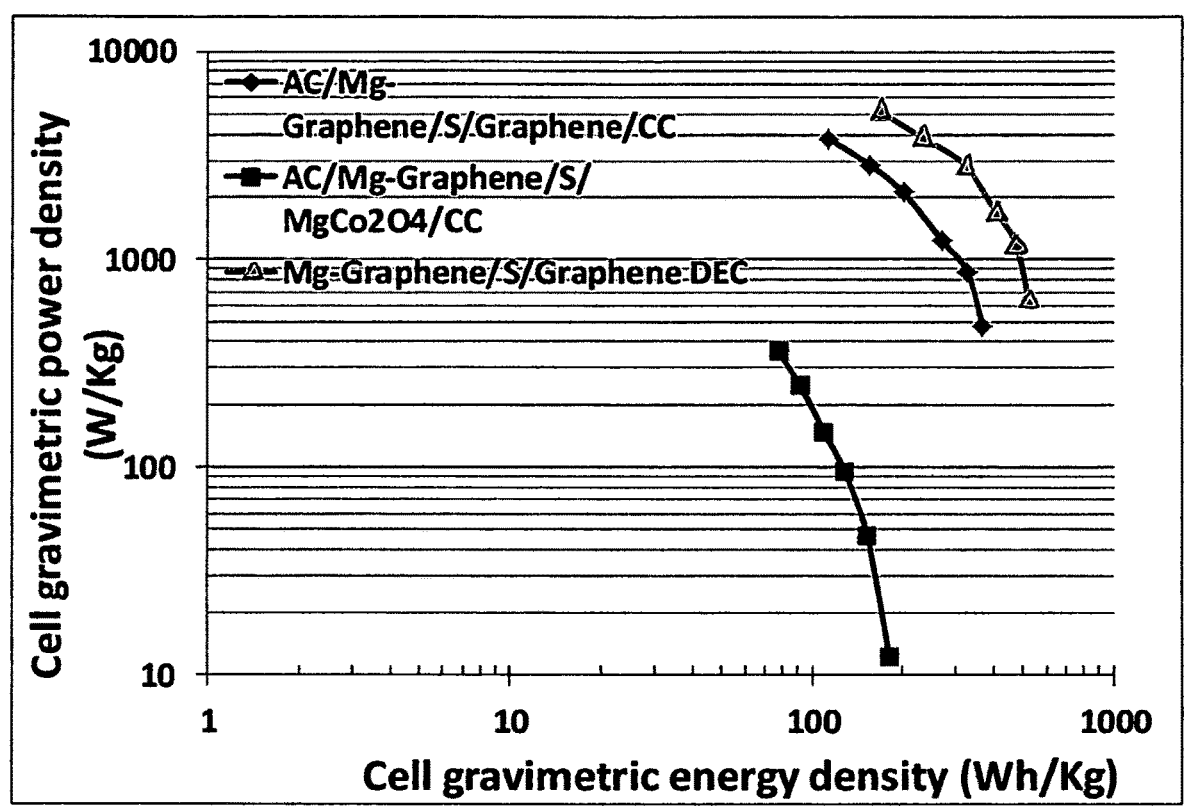
FIG. 10 The Ragone plots of three types of electrochemical cells: (i) a three-layer DEC (pre-magnesiated graphene-based anode current collector, separator, and graphene-based cathode current collector), (ii) a five-layer cell (a copper foil-based current collector, a discrete layer of pre-magnesiated graphene-based anode active material bonded to the anode current collector layer, a separator, a discrete layer of graphene-based cathode current collector, and an Al-based cathode current collector), and (iii) a conventional Mg-ion cell containing a Cu foil-based anode current collector, a layer of pre-magnesiated graphene anode active material, a separator, a layer of $MgCo_2O_4$-based cathode active material, and an Al-based cathode current collector.

The Ragone plots shown in FIG. 10 indicate that the power density of the Mg cell with a graphene anode and graphene cathode and that of the DEC with a graphene anode current collector and graphene cathode current collector are an order of magnitude higher than that of the Mg-ion cell with a $MgCo_2O_4$ cathode. The maximum power density of 3,830 or 5230 W/kg is comparable to that of a symmetric supercapacitor that is known for its high power density. This implies that the presently invented rechargeable Mg cells and DEC cells can be charged and recharged at an exceptional rate. This is a highly desirable feature for a battery intended for use in an EV, power tool, and consumer electronic device. Further significantly, the power density and energy density of the DEC (3 layers) are higher than those of a corresponding Mg cell (5 layers) by a factor of approximately 1.5. It may be further noted that no previously known Li-ion or Mg battery has reached such a high power density, along with such a high energy density (up to an unprecedented 521 Wh/kg for a DEC).

Examples 18-31

Performance of 13 DEC Devices as Additional Examples

Figure 11:
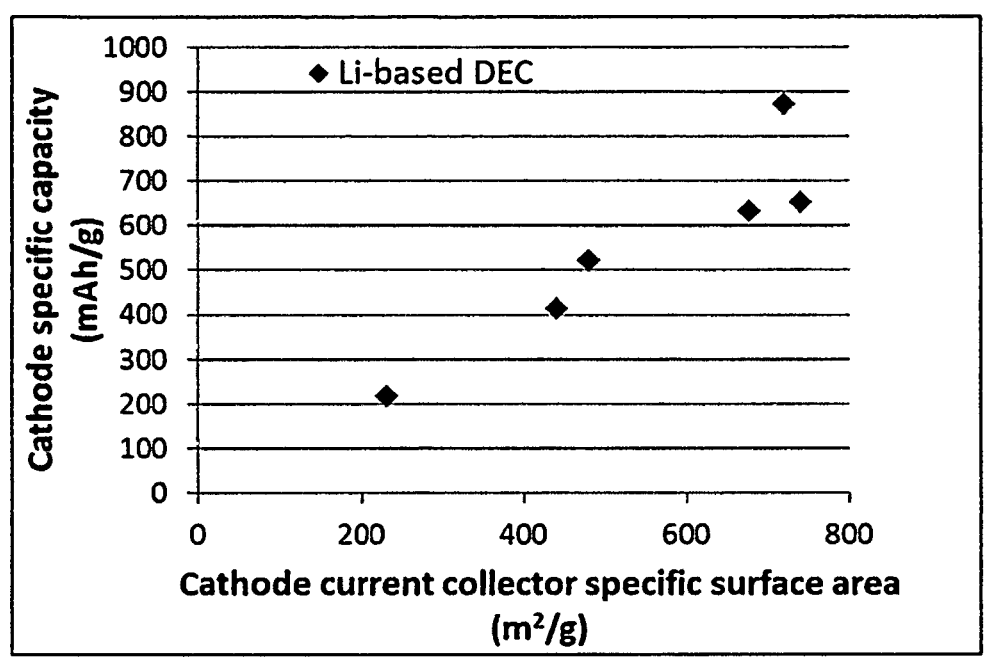
FIG. 11 Cathode specific capacity of a series of dual electroplating cells plotted as a function of the specific surface area of the cathode current collector.

Shown in Table 1 are some additional examples of the DEC cells herein investigated and their main components. The table also shows the data for open circuit voltage (OCV), cathode specific capacity, cell-level specific energy, and specific power of these cells. FIG. 11 demonstrates that the specific capacity of the cathode (current collector) is proportional to the specific surface area of the cathode current collector for Li-based DECs. A higher cathode specific capacity also leads to a higher energy density and higher power density according to the data shown in Table 1.

TABLE 1

Additional Examples of Dual Electroplating Cells.

| Cell | Anode current collector (+ metal ion source) | Electrolyte | Cathode current collector | OCV (volts) | Max. cathode cap. (mAh/g) | Max. energy density, Wh/kg | Max. power density, W/kg |
|---|---|---|---|---|---|---|---|
| DEC-Li-1 | Cu foam | 1M $LiPF_6$ (EC-DiEC) | Pristine graphene, 482 $m^2$/g | 3.8 | 520 | 340 | 7520 |
| DEC-Li-2 | Graphene-coated Cu foam | 1M $LiPF_6$ (EC-DiEC) | Reduced graphene oxide, 742 $m^2$/g | 3.3 | 652 | 416 | 9763 |
| DEC-Li-3 | Ni foam | 1M $LiPF_6$ (EC-DiEC) | RGO, 679 $m^2$/g | 3.0 | 631 | 387 | 4216 |
| DEC-Li-4 | Graphene-coated Ni foam | 1M $LiPF_6$ (EC-DiEC) | Graphene foam, 442 $m^2$/g | 2.5 | 413 | 316 | 3217 |
| DEC-Li-5 | Graphene foam | 1M $LiPF_6$ (EC-DiEC) | Nitrogen-doped graphene, 722 $m^2$/g | 2.6 | 872 | 433 | 8755 |

TABLE 1-continued

Additional Examples of Dual Electroplating Cells.

| Cell | Anode current collector (+ metal ion source) | Electrolyte | Cathode current collector | OCV (volts) | Max. cathode cap. (mAh/g) | Max. energy density, Wh/kg | Max. power density, W/kg |
|---|---|---|---|---|---|---|---|
| DEC-Li-6 | Graphene-coated Ni foam | 1M LiPF$_6$ (EC-DiEC) | Reduced graphene oxide, 232 m$^2$/g | 3.3 | 218 | 141 | 3163 |
| DEC-Na-1 | Meso-porous soft carbon | NaBF$_4$ (DMC-PC) | Graphene paper with embedded steel web, 422 m$^2$/g | 2.6 | 267 | 157 | 2323 |
| DEC-K-1 | Expanded hard carbon | KBF$_4$ (DMC-PC) | Exfoliated MCMB, 362 m$^2$/g | 3.0 | 326 | 168 | 2547 |
| DEC-Mg-1 | Exfoliated graphite fibers | Mg(AlCl$_2$EtBu)$_2$/ THF | RGO-MWCNT blend, 763 m$^2$/g | 2.1 | 428 | 356 | 4346 |
| DEC-Mg-2 | RGO | Mg(AlCl$_2$EtBu)$_2$/ THF | Meso-porous carbon | 2.0 | 386 | 341 | 4148 |
| DEC-Ca-1 | Exfoliated activated carbon | Ca(BF$_4$)$_2$ (DMC-PC) | Activated MCMB | 2.8 | 234 | 116 | 1729 |
| DEC-Zn-1 | Carbon aerogel | Zn(PF$_6$)$_2$ (DMC-PC) | Activated MCMB | 0.7 | 162 | 87 | 872 |
| DEC-Fe-1 | Conductive polymer nano-fiber mat | Fe(BF$_4$)$_2$ (DiEC-PC) | Graphene foam | 0.8 | 52 | 43 | 665 |

In summary, after extensive and in-depth studies, we have developed a new class of energy storage batteries based on new electrochemistry. We have discovered that a broad array of chemically treated or expanded carbonaceous or graphitic materials, prepared in a highly porous structure, can be used as a cathode or anode current collector in a three-layer dual electroplating cell (DEC). A broad array of conductive materials prepared in a highly porous structure (with a specific surface area >>100 m$^2$/g) can also be used to make a DEC. These DECs have the following highly desirable features and advantages:

(a) Having a high-capacity cathode current collector capable of storing metal ions on its massive surfaces up to an amount equivalent to a specific capacity typically >250 mAh/g, more typically >500 mAh/g, and in many cases >800 mAh/g;

(b) Exhibiting a cell-level specific energy typically greater than 250 Wh/kg$_{cell}$, more typically greater than 300 Wh/kg$_{cell}$, and even greater than 500 Wh/kg$_{cell}$ in many cases. Surprisingly, the maximum power densities (3-40 kW/kg) of these cells are 1 to 2 orders of magnitude higher than those of prior art lithium-ion cells, even better than those of the best supercapacitors that are noted for their superior power densities. There has been no prior art electrochemical cell or any energy storage device that can deliver both a high energy density and a high power density as does the presently invented DEC.

(c) Having a high-capacity cathode active material that can be readily prepared without going through an energy-intensive sintering process.

(d) Having an integrated cathode electrode/current collector, with a weight and volume lower than the combined weight and volume of separate and discrete cathode electrode and cathode current collector.

(e) Having an integrated anode electrode/current collector, with a weight and volume lower than the combined weight and volume of separate and discrete anode electrode and anode current collector.

(f) Having a three-layer configuration, as opposed to the usual five-layer configuration.

(g) Having a high-capacity cathode current collector that is capable of storing magnesium or lithium atoms (or other more abundant and less expensive metal atoms or ions, such as K, Na, and Zn) on its massive surfaces without the need to undergo intercalation or solid-state diffusion, thereby leading to a significantly improved power density and reduced recharge times.

(h) Having a cathode current collector that is electrically and thermally conductive, enabling high-rate capability and effective heat dissipation in a rechargeable cell.

(i) Having a high-capacity cathode current collector that contains little or no oxygen, reducing or eliminating the potential for fire hazard or explosion.

We claim:

1. A dual electroplating cell comprising:
(a) an electrolyte containing therein ions of a first metal;
(b) a porous cathode current collector having surface areas to capture and store ions of said first metal directly thereon, without using a separate cathode active material, when said cell is discharged, and to release ions of said first metal when said cell is charged, wherein said cathode current collector has a specific surface area greater than 100 m$^2$/g that is in direct contact with said electrolyte, wherein said cathode current collector is a porous, electrically conductive material of graphene-coated metal foam;
(c) a porous anode current collector having surface areas to capture and store ions of said first metal thereon, without using a separate anode active material, when said cell is charged, and to release ions of said first metal when said cell is discharged, wherein said anode current collector has a specific surface area greater than 100 m$^2$/g that is in direct contact with said electrolyte, wherein said anode current collector has interior planes that are in direct and physical contact with said electrolyte and are capable of capturing ions of said first metal directly from said electrolyte and storing said ions thereon without having to undergo solid-state diffusion or intercalation;
(d) a porous separator disposed between the anode current collector and the cathode current collector; and (e) an ion source of said first metal disposed in said anode current collector or said cathode current collector and in electronic contact therewith to obtain an open circuit voltage (OCV) from 0.1 volts to 4.5 volts when the cell is made; wherein ions of said first metal are shuttled between said anode current collector surface areas and said cathode current collector surface areas during charging and discharging of said cell.

2. The dual electroplating cell of claim 1, wherein the ion source comprises a chip, foil, powder, particle, fiber, rod, wire, film, coating, or a combination thereof of said first metal, alloy of said first metal, or compound of said first metal in contact with said anode current collector or said cathode current collector.

3. The dual electroplating cell of claim 1, wherein said first metal is selected from:
(A) an alkali metal selected from lithium (Li), sodium (Na), potassium (K), rubidium (Rb), caesium (Cs), francium (Fr), or a combination thereof;
(B) an alkaline-earth metal selected from beryllium (Be), magnesium (Mg), calcium (Ca), strontium (Sr), barium (Ba), radium (Ra), or a combination thereof;
(C) a transition metal; or
(D) aluminum (Al), gallium (Ga), indium (In), tin (Sn), lead (Pb), or bismuth (Bi); or a combination thereof.

4. The dual electroplating cell of claim 1 wherein said cathode or anode current collector has a specific surface area from 500 $m^2/g$ to 1500 $m^2/g$.

5. The dual electroplating cell of claim 1 wherein said cathode or anode current collector has a specific surface area greater than 1,000 $m^2/g$.

6. The dual electroplating cell of claim 1, wherein the electrolyte is organic liquid electrolyte, ionic liquid electrolyte, gel electrolyte, polymer electrolyte, solid electrolyte, or a combination thereof.

7. The dual electroplating cell of claim 1, wherein said anode current collector further contains first metal-preloaded particles disposed in pores of said anode current collector, or wherein said anode current collector is pre-impregnated with said first metal.

8. The dual electroplating cell of claim 1 wherein said cathode or anode current collector contains mesoscale pores having a pore size from 2 nm to 50 nm.

9. The dual electroplating cell of claim 1 wherein said open circuit voltage is from 0.5 volts to 3.5 volts.

10. The dual electroplating cell of claim 1, further containing an ion source of at least a second metal.

11. A dual electroplating cell comprising: (a) an anode; (b) a cathode; (c) an electrolyte component containing therein ions of at least a first metal; (d) a porous separator disposed between the anode and the cathode; and (e) an ion source of at least said first metal disposed in said anode or said cathode and in electronic contact therewith;
wherein said cathode is made of a porous integrated cathode current collector, having surface areas to capture and store metal ions directly thereon, without using a separate cathode active material, when said cell is discharged, and to release ions of said first metal when said cell is charged and without having to undergo solid-state diffusion or intercalation and having a specific surface area greater than 100 $m^2/g$ that is in direct and physical contact with said electrolyte; and/or
wherein said anode is made of a porous integrated anode current collector, having surface areas to capture and store metal ions directly thereon, without using an additional or a separate anode active material, when said cell is charged, and to release ions of said first metal when said cell is discharged and without having to undergo solid-state diffusion or intercalation and having a specific surface area greater than 100 $m^2/g$ that is in direct and physical contact with said electrolyte, wherein said cathode current collector or anode current collector is a porous, electrically conductive material selected from carbon-coated metal foam, graphene-coated metal foam, perforated metal sheet, carbon-coated porous metal sheet, graphene-coated porous metal sheet, surface-passivated porous metal, conductive polymer foam, or a combination thereof;
wherein ions of said first metal are shuttled between said anode current collector surface areas and said cathode current collector surface areas during charging and discharging of said cell, and
wherein said first metal is selected from: an alkali metal selected from sodium (Na), potassium (K), rubidium (Rb), caesium (Cs), francium (Fr), or a combination thereof; an alkaline-earth metal selected from beryllium (Be), magnesium (Mg), calcium (Ca), strontium (Sr), barium (Ba), radium (Ra), or a combination thereof; a transition metal; or aluminum (Al), gallium (Ga), indium (In), tin (Sn), lead (Pb), or bismuth (Bi); or a combination thereof.

12. The dual electroplating cell of claim 11, wherein the ion source comprises a chip, foil, powder, particle, fiber, rod, wire, film, coating, or a combination thereof of said first metal, alloy of said first metal, or compound of said first metal in contact with said anode current collector or said cathode current collector.

13. The dual electroplating cell of claim 11 wherein said cathode or anode current collector has a specific surface area from 500 $m^2/g$ to 1500 $m^2/g$.

14. The dual electroplating cell of claim 11 wherein said cathode or anode current collector has a specific surface area greater than 1,000 $m^2/g$.

15. The dual electroplating cell of claim 11, wherein said conductive polymer foam contains a binder and/or reinforcement filler selected from a resin binder, a conductive polymer binder, a carbonized resin binder, carbon nanotube, carbon nanofiber, or a combination thereof.

16. A dual electroplating cell comprising: (a) an anode; (b) a cathode; (c) an electrolyte component containing therein ions of at least a first metal; (d) a porous separator disposed between the anode and the cathode; and (e) an ion source of at least said first metal disposed in said anode or said cathode and in electronic contact therewith;
wherein said cathode is made of a porous integrated cathode current collector, having surface areas to capture and store metal ions directly thereon, without using a separate cathode active material, when said cell is discharged, and to release ions of said first metal when said cell is charged and having a specific surface area greater than 100 $m^2/g$ that is in direct contact with said electrolyte; and/or
wherein said anode is made of a porous integrated anode current collector, having surface areas to capture and store metal ions directly thereon, without using an additional or a separate anode active material, when said cell is charged, and to release ions of said first metal when said cell is discharged and having a specific surface area greater than 100 $m^2/g$ that is in direct contact with said electrolyte, wherein said cathode current collector or anode current collector is a porous, electrically conductive material selected from carbon-coated metal foam, graphene-coated metal foam, perforated metal sheet, carbon-coated porous metal sheet, graphene-coated porous metal sheet, surface-passivated porous metal, conductive polymer foam, or a combination thereof;

wherein ions of said first metal are shuttled between said anode current collector surface areas and said cathode current collector surface areas during charging and discharging of said cell, and wherein said first metal is selected from: an alkali metal selected from sodium (Na), potassium (K), rubidium (Rb), caesium (Cs), francium (Fr), or a combination thereof; an alkaline-earth metal selected from beryllium (Be), magnesium (Mg), calcium (Ca), strontium (Sr), barium (Ba), radium (Ra), or a combination thereof; a transition metal; or aluminum (Al), gallium (Ga), indium (In), tin (Sn), lead (Pb), or bismuth (Bi); or a combination thereof.

17. A method of operating a dual electroplating cell of claim 1, said method comprising discharging said cell to a first lower voltage limit (LVL) lower than said OCV after said cell is made and then charging said cell to an upper voltage limit.

18. A method of operating a dual electroplating cell of claim 11, said method comprising discharging said cell to a first lower voltage limit (LVL) lower than an open circuit voltage (OCV) that is measured when said cell is made, and then charging said cell to an upper voltage limit.

* * * * *